(12) United States Patent
Houghton

(10) Patent No.: US 9,164,518 B2
(45) Date of Patent: Oct. 20, 2015

(54) WATER DELIVERY SYSTEM WITH NON-CONTACT USER-OPERATED CONTROL

(76) Inventor: Harmon Houghton, Santa Fe, NM (US)

(*) Notice: Subject to any disclaimer, the term of this patent is extended or adjusted under 35 U.S.C. 154(b) by 439 days.

(21) Appl. No.: 13/252,483

(22) Filed: Oct. 4, 2011

(65) Prior Publication Data

US 2012/0255116 A1 Oct. 11, 2012

Related U.S. Application Data

(60) Provisional application No. 61/389,644, filed on Oct. 4, 2010, provisional application No. 61/497,186, filed on Jun. 15, 2011, provisional application No. 61/497,189, filed on Jun. 15, 2011.

(51) Int. Cl.
| | |
|---|---|
| *E03B 1/04* | (2006.01) |
| *F16K 11/16* | (2006.01) |
| *F16K 31/04* | (2006.01) |
| *G05D 23/13* | (2006.01) |
| *E03C 1/05* | (2006.01) |

(52) U.S. Cl.
CPC .......... *G05D 23/1393* (2013.01); *E03C 1/057* (2013.01); *E03C 1/052* (2013.01); *Y10T 137/87676* (2015.04)

(58) Field of Classification Search
CPC .... E03C 1/057; G05D 23/1393; E03D 5/105; Y10T 137/87692
USPC .......... 251/129.04; 137/607, 625; 236/12.11, 236/12.12
See application file for complete search history.

(56) References Cited

U.S. PATENT DOCUMENTS

| | | | |
|---|---|---|---|
| 1,176,784 A | 3/1916 | Speiden | |
| 1,494,883 A | 5/1924 | Bassette et al. | |
| 1,848,456 A | 3/1932 | Beebe | |
| 1,970,039 A | 8/1934 | Fraser | |
| 2,116,806 A | 5/1938 | Zinkil et al. | |
| 2,188,258 A | 1/1940 | Zinkil et al. | |
| 2,264,876 A | 12/1941 | Hackley | |
| 2,281,370 A | 4/1942 | Morrison et al. | |
| 2,287,011 A | 6/1942 | Beebe | |
| 2,542,046 A | 2/1951 | Mullett et al. | |
| 2,774,135 A | 12/1956 | Phillips, Jr. | |
| 2,830,618 A | 4/1958 | Mitchell | |
| 2,929,405 A | 3/1960 | Beebe | |
| 2,965,906 A | 12/1960 | Mullett et al. | |
| 4,381,073 A | 4/1983 | Gloor | |
| 4,682,728 A * | 7/1987 | Oudenhoven et al. | 236/12.12 |
| 4,735,357 A * | 4/1988 | Gregory et al. | 236/93 R |
| 4,756,030 A * | 7/1988 | Juliver | 4/668 |
| 4,945,943 A * | 8/1990 | Cogger | 137/360 |
| 5,095,941 A | 3/1992 | Betz | |
| 5,199,119 A | 4/1993 | Weber | |
| 5,322,084 A | 6/1994 | Ghiassian | |
| 5,386,600 A | 2/1995 | Gilbert, Sr. | |
| RE35,018 E * | 8/1995 | Homan | 236/12.12 |
| 5,507,314 A | 4/1996 | Knapp | |
| 5,924,449 A | 7/1999 | Enoki et al. | |
| 5,931,181 A | 8/1999 | Cook et al. | |
| 5,941,504 A | 8/1999 | Toma et al. | |

(Continued)

*Primary Examiner* — Marina Tietjen
*Assistant Examiner* — Seth W. Mackay-Smith

(57) ABSTRACT

A water delivery system operable hands-free by, for example, a foot-operated pedal controller, or a non-contact controller, such as a presence and voice actuated circuit that are operatively connected through a power source, transmission and valve assembly in cooperation with a water spout at a water basin or bowl.

6 Claims, 28 Drawing Sheets

(56) References Cited

U.S. PATENT DOCUMENTS

| | | | |
|---|---|---|---|
| 6,067,675 A | 5/2000 | Boyette | |
| 6,446,281 B1 | 9/2002 | Kim | |
| RE37,888 E * | 10/2002 | Cretu-Petra | 236/12.12 |
| 6,473,917 B1 * | 11/2002 | Mateina | 4/676 |
| 6,724,873 B2 * | 4/2004 | Senna Da Silva | 379/102.01 |
| 6,874,175 B2 * | 4/2005 | Laflamme et al. | 4/541.1 |
| 6,968,860 B1 * | 11/2005 | Haenlein et al. | 137/613 |
| 7,255,327 B2 * | 8/2007 | Houghton | 251/295 |
| 7,363,943 B2 | 4/2008 | Cheng | |
| 7,584,898 B2 * | 9/2009 | Schmitt et al. | 236/12.12 |
| 7,690,395 B2 * | 4/2010 | Jonte et al. | 137/624.11 |
| 7,946,504 B2 * | 5/2011 | Shapira et al. | 236/12.12 |
| 2005/0151101 A1 | 7/2005 | McDaniel et al. | |
| 2007/0246550 A1 * | 10/2007 | Rodenbeck et al. | 236/12.11 |
| 2007/0267074 A1 | 11/2007 | Houghton | |
| 2008/0083893 A1 | 4/2008 | Rubenstein | |
| 2008/0271238 A1 * | 11/2008 | Reeder et al. | 4/597 |
| 2009/0039176 A1 * | 2/2009 | Davidson et al. | 239/67 |
| 2009/0056011 A1 * | 3/2009 | Wolf et al. | 4/623 |
| 2010/0012194 A1 | 1/2010 | Jonte et al. | |
| 2010/0025609 A1 | 2/2010 | Pubben et al. | |
| 2010/0200789 A1 | 8/2010 | Connors | |

\* cited by examiner

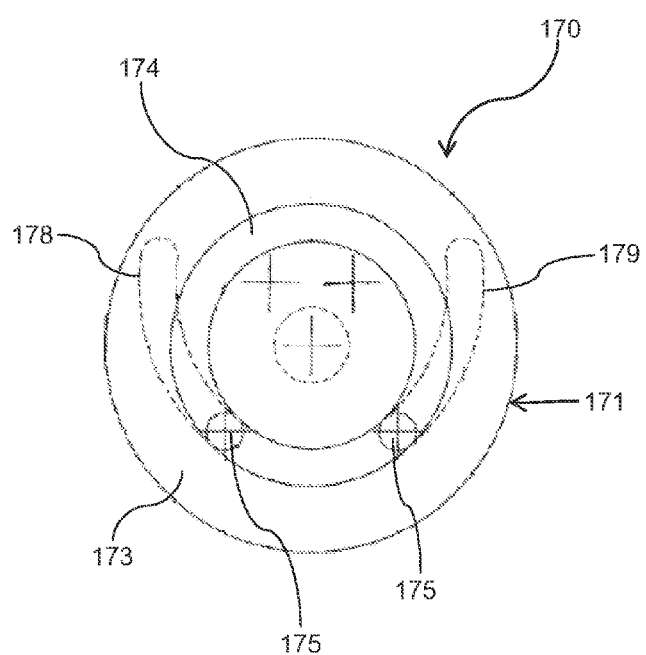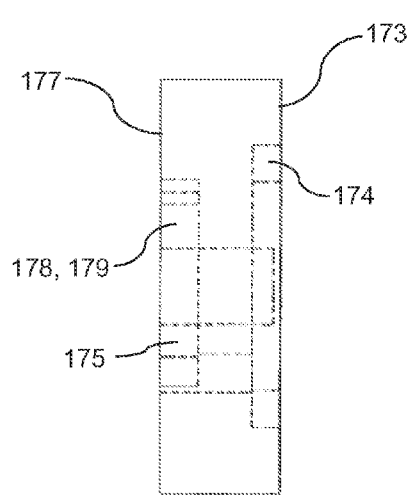
*FIG. 10a*  *FIG. 10b*

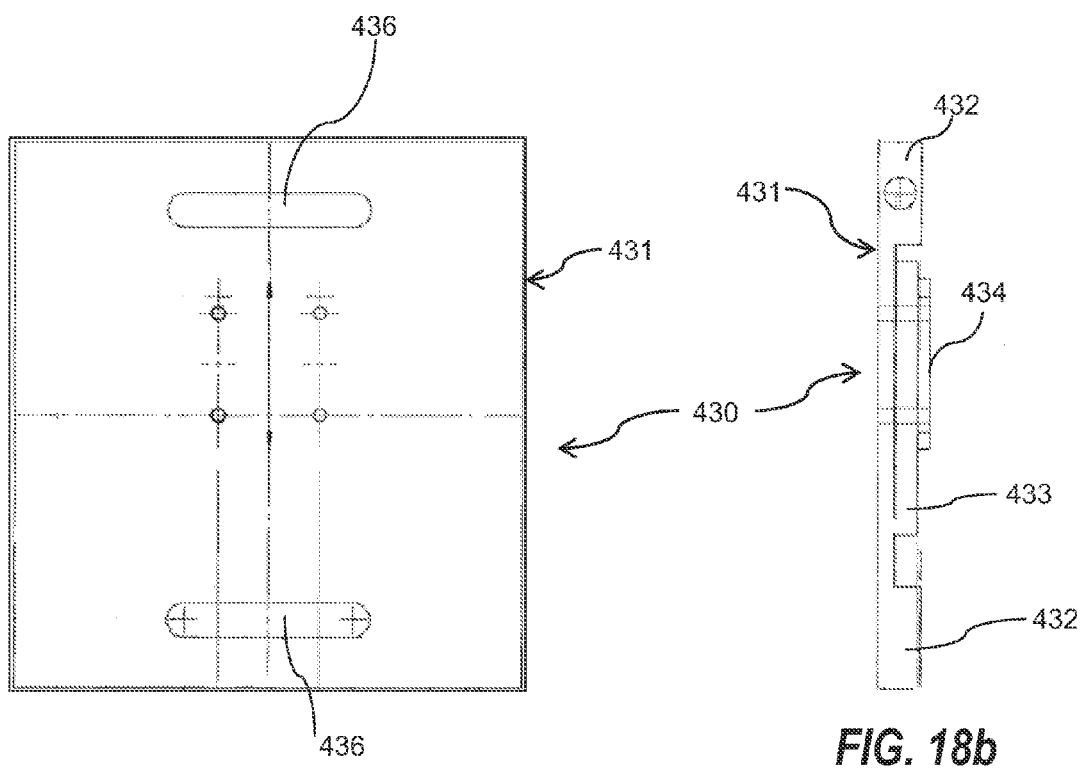
FIG. 18a
FIG. 18b
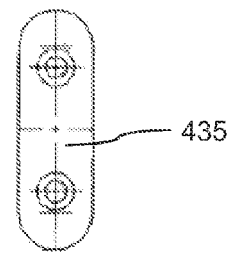
FIG. 19a
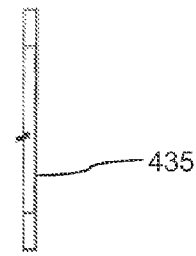
FIG. 19b

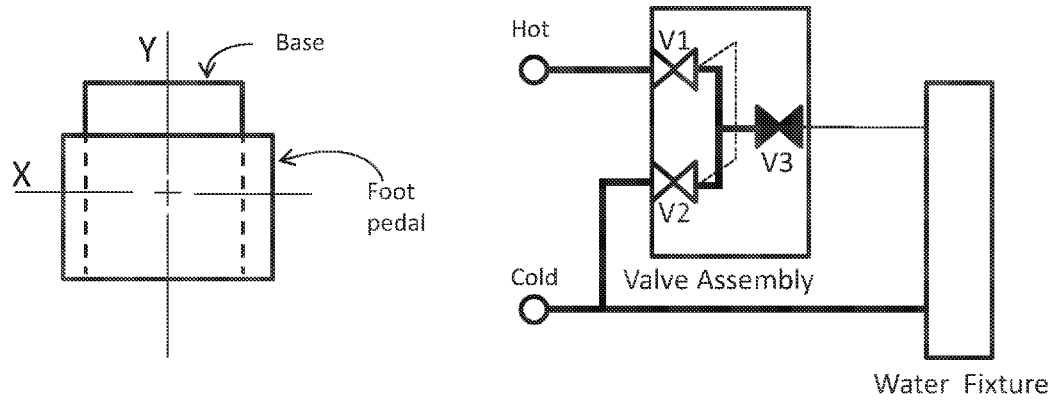
Figure X-1    "OFF"/"BYPASS" MODE
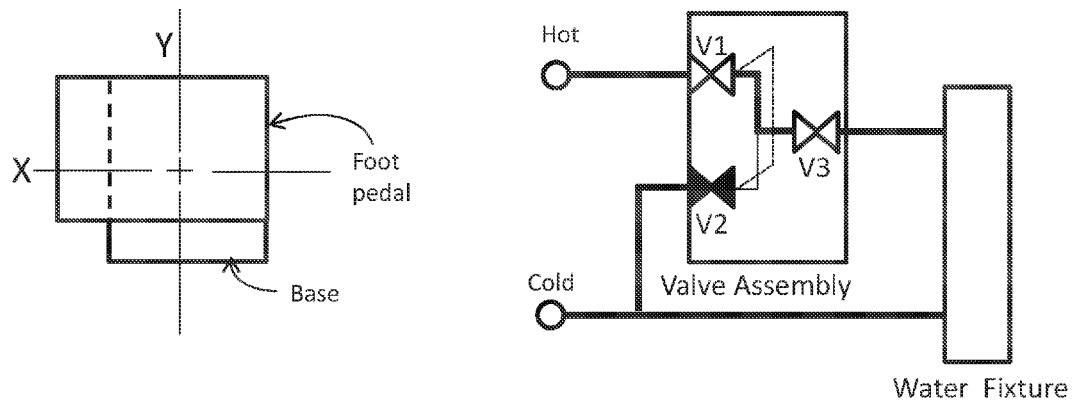
Figure X-2    "HOT" MODE
*FIG. 27*

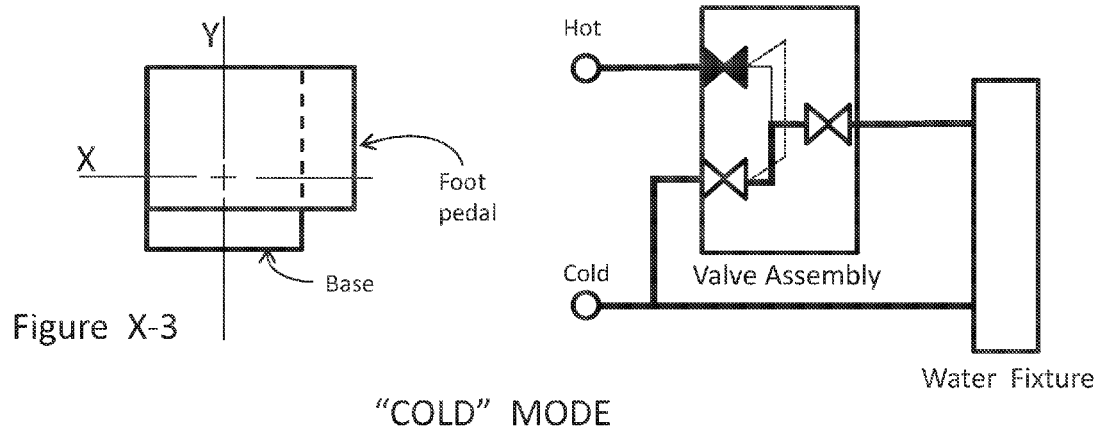
"COLD" MODE
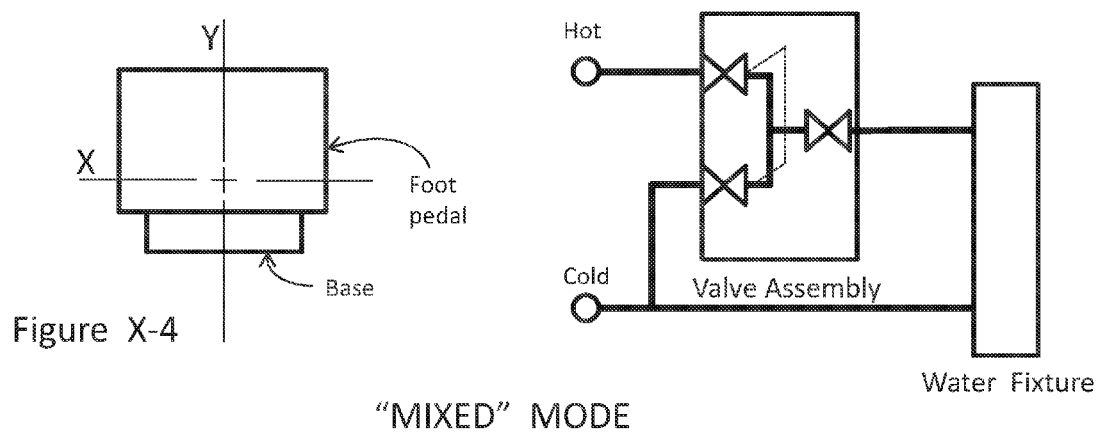
"MIXED" MODE
*FIG. 28*

WATER DELIVERY SYSTEM WITH NON-CONTACT USER-OPERATED CONTROL

This application claims priority to provisional patent application Ser. No. 61/389,644, filed Oct. 4, 2010 and entitled "Valve Apparatus and System," Ser. No. 61/497,186 filed Jun. 15, 2011 and entitled "Shower System," and Ser. No. 61/497,189, filed Jun. 15, 2001 and entitled "Grey Water Collection System." This application incorporates by reference the disclosure in each of said provisional applications and additionally incorporates by reference utility patent application Ser. Nos. 12/779,838 and 12/779,842 each entitled "Valve Apparatus and System," both filed on May 13, 2010.

TECHNICAL FIELD OF THE INVENTION

The field of the present invention relates generally to a system for the delivery of water with controlled and/or regulated water flow and temperature using a "hands free" controller in conjunction with or without a conventional water faucet fixture. The field more particularly relates to a hands-free system including a controller which may be electromechanical or other signal-producing sub-systems for operatively actuating a valve assembly that regulates the temperature and flow rate of water through the system.

BACKGROUND OF THE INVENTION

In the modern world, the limitation of natural resources has focused attention on the use of two resources that are relevant to the present invention. First, there is concern that an increase in world population places a greater burden on the availability of fresh potable water and the allocation between agriculture, industry and residential use. It is well understood that the former enterprises, such as a farm or factory, are substantial users of water. But on the other hand, while residential water use may be significantly less on a per-site basis, the vast number of residences aggregate to a water usage that is a heavy burden on this natural resource. Water conservation has therefore become a matter of worldwide attention requiring reconsideration of conventional water delivery systems in various types of facilities. The conventional hand-wash basin, in both public and private facilities is a great source of water waste due to user habits and limitations of conventional water delivery systems. Attempts to limit the water wasted is apparent in public areas where hand wash basins are controlled by an infrared sensor that permits or blocks the flow of water, generally at a single though comfortable temperature. Waste also arises as a result of the common habit of "waiting for the water to warm up" before washing hands, taking a shower, or filling vessels for use in culinary applications.

In many, if not most, hand-wash basin applications, as well as in kitchen applications in a home, and in many commercial and industrial applications it is desirable to provide a source of hot water for use in its many applications that are familiar to the reader. The conventional source of hot water is the hot water tank that in modern facilities is an electric or gas operated water heater although there are modern alternatives to the classic or conventional hot water tank. Of course, maintaining water at an elevated temperature by any means requires the consumption of energy thus increasing the burden on those natural resources used to produce energy. In typical present hand wash basin applications, water may be adjusted to an elevated temperature and allowed to run while the user is pursuing some parallel activity thus resulting in hot water being wasted by return to a conventional water drain and deposit into a sewer. The inattention to the running of hot water may be due to the fact that the user may be engaged in an activity in which both hands are required thus precluding the user from promptly terminating the flow of water resulting in the energy waste.

Still another problem that exists in terms of water delivery systems, particularly of the hand wash basin usage as described above, is the need for maintaining hygiene or sterility. Users often approach a hand wash basin with the typical handle or handles with hands that have been soiled or have been exposed to microscopic organisms that may contribute to sickness and disease. When the user grasps the handles of the conventional water fixture, the transmission of these hand-carried microscopic organisms onto the handles become a potential source for spreading the organisms and thus spreading the possible disease or sickness they carry. It would be highly desirable to sanitize the use of the conventional water fixture by controlling the temperature and flow rate of water other than by the user's hands and the water fixture handles.

This objective is commonly referred to as "hands free" operation of the water delivery system. Maintaining a sterile condition of the water fixture can also operate in reverse from that just described. For example, the user may draw water engaging in an activity in connection with the water that fails to sanitize the user's hands such that when the user wishes to terminate use of the water delivery system, they grasp the handles of the conventional faucet and thus perhaps pass dangerous microbes on the user's hands on to the fixture handles where it awaits a subsequent user and the spreading of disease or sickness caused by the organism.

The present invention offers a partial solution to limited natural resources as well as to maintain a hygienic condition by avoiding the transmission of infections, sickness or disease as a result of usage of a water delivery system.

SUMMARY OF THE INVENTION

A water delivery system comprising a water fixture, having two water inlets, a compartment within such fixture in water communication with the inlet, a water output spout, and a handle for manually controlling the temperature and flow rate from the spout; a valve assembly including at least two chambers, a first chamber in water communication with an ambient temperature water source and an elevated temperature water source; a first valve within said first chamber for selective water communication with said two water sources; the ambient temperature water source also in water communication with one of the inlets of said fixture; and a second chamber in water communication with said first chamber and in selective water communication with said other fixture inlet and a second valve for selectively connecting the second chamber in water communication with the other fixture inlet. The system additionally includes a user-operated controller in operative engagement with a power source, the power source in operative engagement with a transmission device, and the transmission device selectively positioning the first valve in the first chamber to connect the ambient temperature water with the elevated temperature water in a selected proportion that regulates the temperature of the water in the first chamber, and positioning the second valve in the second chamber to connect the first chamber and the second chamber and to connect the second chamber to the fixture other inlet to determine the flow rate of water at the determined temperature from the spout A water delivery system comprising a conventional water fixture including two water inlets, a compartment in water communication with the inlets, a water spout, and a handle for manually controlling the temperature and flow rate from the spout, a valve assembly for receiving hot and cold water setting or regulating the temperature of the water and the flow rate of water through the valve assembly to one of the water fixture inlets, and the cold water inlet additionally connected to the other of the fixture inlets; at least one power source; a transmission subassembly operatively interconnecting said valve assembly and said power source; and a user-operated controller in operative engagement with at least one power source, the controller comprising an electronic circuit activated or deactivated without physical contact between the controller and user.

A water delivery system of the type described above in which the water fixture is replaced by a spout that is connected to the regulated water supply inlet.

BRIEF DESCRIPTION OF THE DRAWINGS

FIGS. 10a and b show front and side views of the valve body shown in FIG. 9 together with an additional perspective view of the valve;

FIGS. 18a and b is a plan and side view of the second slide plate shown in FIG. 17;

FIGS. 19a and b is a front and side view of a slide;

FIG. 27 shows a diagrammatic view of a foot pedal assembly and a valve assembly and the cooperative engagement between such assemblies in an OFF/PASS mode of operation and a HOT mode of operation;

FIG. 28 shows two further diagrammatic views as in FIG. 27 showing the system in the COLD mode of operation and in the MIXED mode of operation;

DETAILED DESCRIPTION

The present invention may be implemented in various embodiments and the following description of several embodiments will show the breadth and various unique features of the invention.

Figure 1:
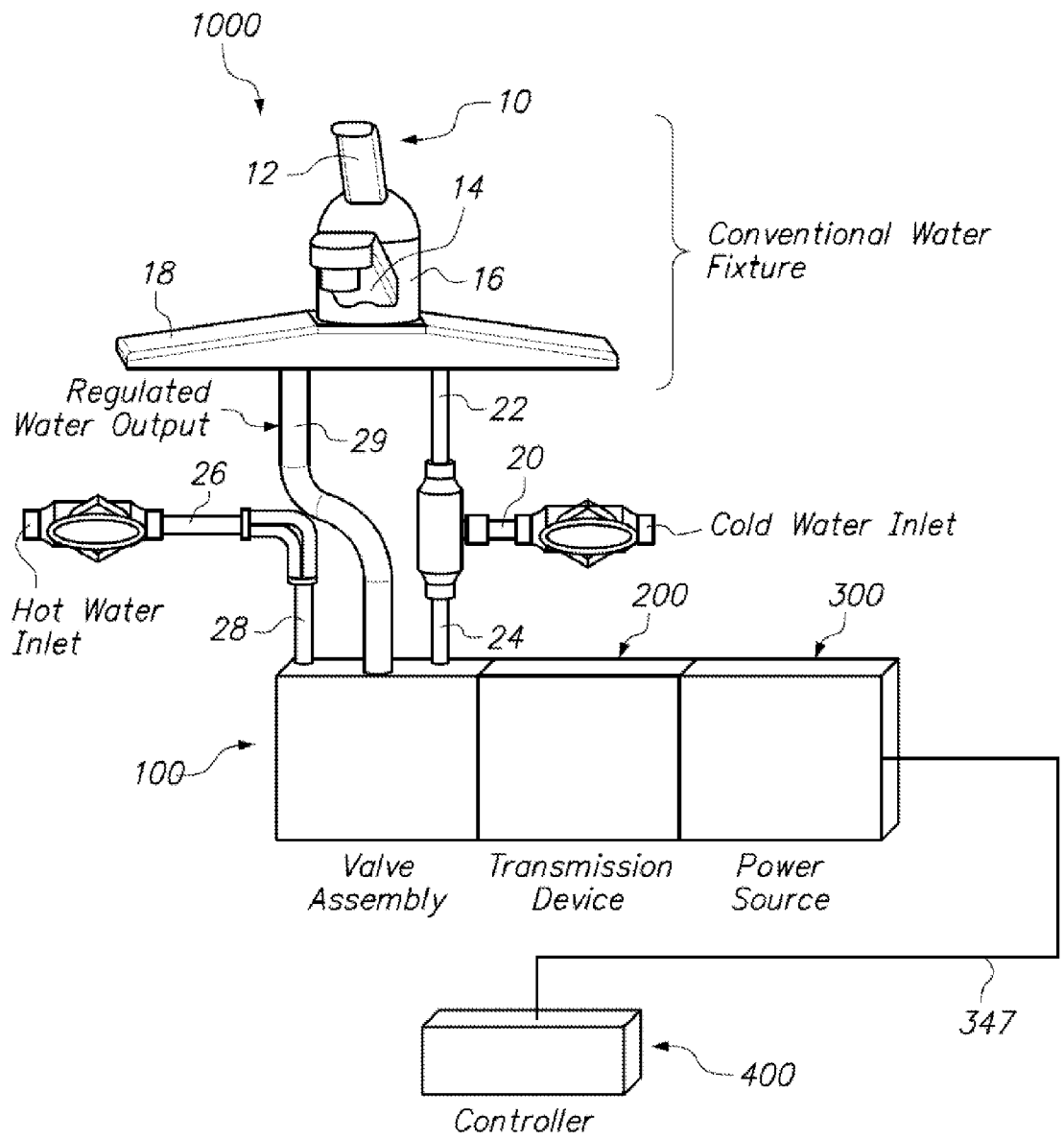
FIG. 1 is a diagrammatic view of one embodiment of a water delivery system in accordance with the present invention.

Generally, the first described embodiment of the invention, shown in FIG. 1, comprises a water delivery system 1000 including a conventional water fixture 10, and various system assemblies or sub-assemblies including: valve assembly 100, transmission assembly, device or mechanism 200, power source 300, and controller 400. The conventional water fixture permits the present invention, in one embodiment, to be an improvement, addition, complement, or subsystem of a complete water delivery system. Alternatively, the water delivery system of the invention may comprise, in place of the conventional water fixture, a housing with one or two inlets and a sprout without a handle or handles for manual user control or simply a spout with one water inlet. Each of the system assemblies will be individually described, followed by a description of the operation of the entire water delivery system shown in the embodiments of this description.

Conventional Water Fixture

The term "conventional water fixture" is intended to include the normally visible portion of a water delivery system that is mounted on a user-accessible top of a sink or wash basin together with standard water inlets from a conventional source of water at ambient temperature, such as a city water system, private water system or the like and from a source of water at an elevated temperature, such as a hot water tank. With reference to FIG. 1, the user accessible portion 10 of the conventional water fixture as defined comprises a handle 12, a water spout 14, a mixing area or volume 16, in a housing or body 18. As shown, control of the water volume or flow rate and temperature of the conventional water fixture is effected through a single user-operated handle. However, as in less expensive or older conventional water fixtures, there may be two separate handles, one for hot water and one for cold water, which are individually manipulated by the user to obtain the desired water volume and temperature. The present invention is usable with most conventional water fixtures. It will therefore be understood that the present invention is particularly adapted as a retrofit, improvement, or rehabilitation of an existing conventional water system having the typical fixture body, enclosure, spout and handle.

It will also be understood that the present invention, as in the description of the embodiment within this specification, may also be used in new installations in which the conventional water fixture is eliminated and the wash basin sink, or other repository for unused water comprises a single spout which, as will be described below, is connected to a regulated water outlet of the valve assembly described below.

The conventional water fixture 10 additionally includes a cold water inlet 20 connected to a water inlet pipe 22 that provides water to the mixing enclosure within body 16 of the user-accessible water fixture 10 of the water delivery system 1000. In the embodiment of the present invention, an additional cold water inlet pipe 24 is connected to valve assembly 100 as explained more fully below. The cold water inlet 20 is connected to a city water system, private water system, or other conventional source of water at ambient temperature but described here as "cold water" to distinguish it from the source of water that is at an elevated temperature.

As suggested above, the conventional water fixture also includes a source of hot water that may be supplied from a conventional home, commercial or industrial hot water tank, or other sources for heating water such as instant-heat devices. The hot water inlet passes through a pipe 26 and through a second pipe 28 that is terminated in the valve assembly 100 as will be described in greater detail below. In a conventional water delivery system, the hot water inlet would be connected directly to the mixing area or volume compartment within housing 16 of the water fixture 10. In the embodiment shown of the present invention, the hot water inlet is not connected directly to the conventional water fixture 10 but is connected solely to the valve assembly 100. By contrast, the cold water inlet 20 is divided between the valve assembly 100 and the fixture inlet water pipe 22. The purpose of the split delivery of the cold water, that is, to both the conventional water fixture 10 mixing volume within housing 16 and the valve assembly 100 is to permit use of the water delivery system in a bypass mode, that is, where the valve assembly 100 is not providing regulated water output but is in a dormant or static state by choice of the user through the controller 400 as will be explained. Thus, the user is always assured of the ability to operate the water delivery system in a conventional manner utilizing the handle 12 as an alternative to delivering the water in a regulated condition prior to entry into the water fixture.

In the embodiment of the present invention, the valve assembly 100 outputs regulated water through a pipe 29 and into the conventional water fixture mixing chamber of housing 16. The term "regulated" water is used in the descriptions of the embodiments of the present invention to indicate that the water has been adjusted, conditioned, controlled or changed from its entry condition with respect to both temperature and volume (flow rate). Regulation of the water input to the conventional water fixture through pipe 29 is the function of the other assemblies of the embodiment shown, that is, valve assembly 100, transmission device 200, power source 300 and controller 400.

It will be understood that the term "passage" is used in its broadest sense in the following description so as to encompass any enclosed water carrier or conventional pipe having a cylindrical or other cross-section, such as a tube or line that may be rigid or flexible. The word "passage" is also used to describe one or more holes in a solid body, such as holes drilled, milled or cast in such body. The term "pipe" is also used to include elbows, "tees," or any other means for dividing water from a single passage into one or more other passages.

Valve Assembly

Within valve assembly 100 is structure for controlling both the temperature and volume or flow rate of water to the conventional water fixture 10. As an overview, in the embodiment described below, each of the two water inlets from the hot and cold water sources are connected to a first chamber, that in response to the controller 400, through the power source and transmission assemblies, 300 and 200, determine the amount of hot water and cold water introduced into the first chamber. The valve assembly includes a second chamber where flow control is regulated or set. In between the first and second chambers, there may be a third chamber, connecting the two, sometimes referred to as a septum that provides a water connection between the first and second chambers. The water connection, that may be direct rather than through a third chamber, is selectively controlled by a second valve that also sets the flow rate into the second of the two water fixture inlets through an outlet passage.

In one embodiment of valve assembly 100, the valve assembly comprises a body 110 that may be formed from a variety of materials, such as metal, plastic, or various composite materials. The body may be cast, molded, or machined. The chosen material should be compatible with the process selected for constructing body 110. In this embodiment of the present invention, the body is constructed from three components, portions, or sections 120, 140, and 160.

Figure 2:
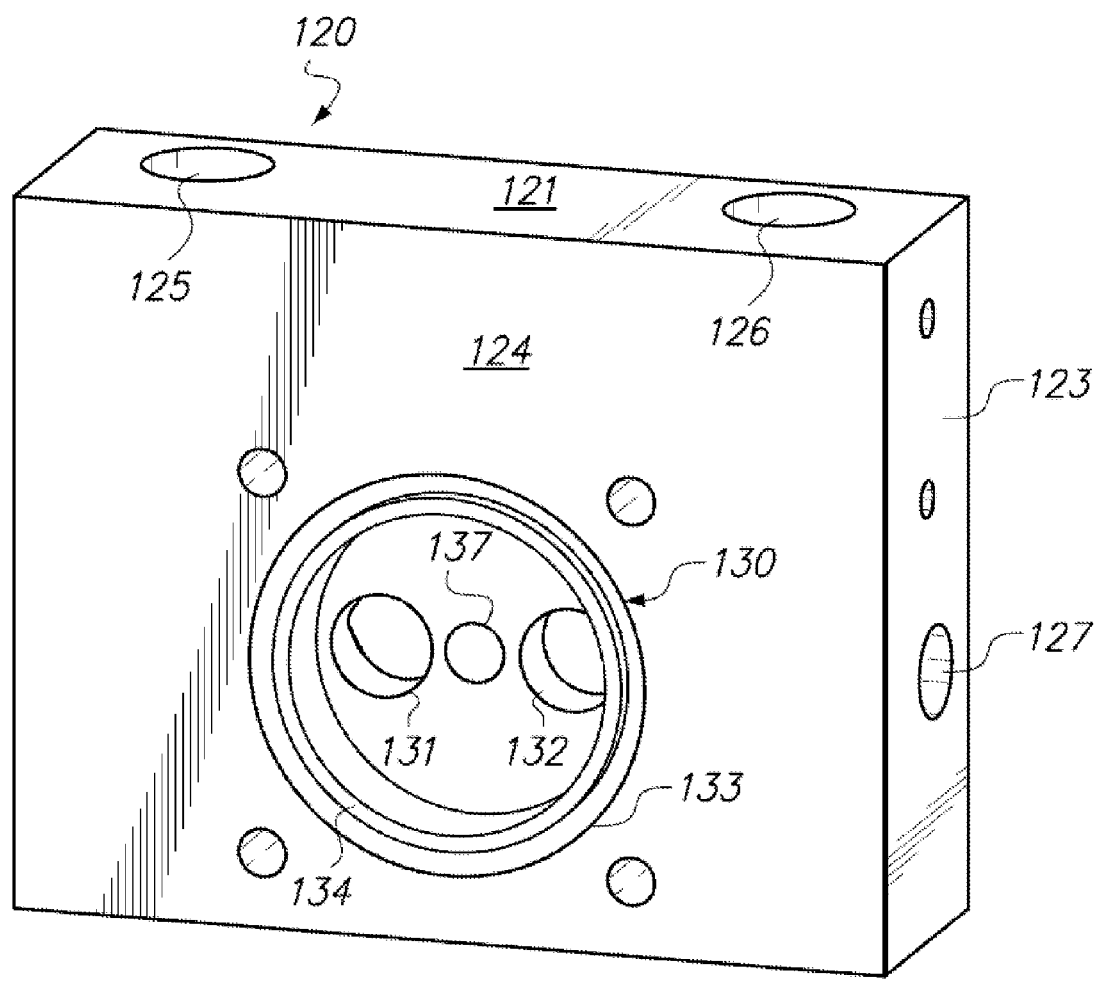
FIG. 2 is a perspective view of one section of a valve body for a valve assembly of one embodiment of the present invention.

The first section 120 of body 110 as seen best in FIG. 2 comprises a rectangular solid having a top edge 121 and two side edges 122 and 123, the latter of which is shown best in FIG. 3b, an inner face 124, and an exterior face. Top edge 121 is provided with a pair of spaced apart openings 125, 126 which are connected, respectively, to hot water inlet pipe 28 through a vertical passage 29 and cold water inlet pipe 24 through a second vertical passage 25. On side edge 123, there is an opening 127, for providing a horizontal passage from cold water inlet opening 126 and vertical passage 25 into a first chamber shown generally at 130. As described and shown below, the opening 127, upon assembly of the valve body 110, is plugged and is merely an artifact of the particular manufacturing process selected for the embodiment of the valve body 110. A similar opening 125 and vertical passage 29 interconnects the hot water pipe 28 to the chamber 130. It will be understood by one of ordinary skill in the art that a water carrying passage or channel can be formed within the body first section 120 in various ways depending upon the manufacturing technique chosen. In the embodiment shown, the body portion 120, as are body portions 140 and 160, are fabricated from Delrin, a preferred material for its machinability, inertness and stability and the vertical passages 25 and 29 and horizontal passages 127 and 128 are drilled holes. However, the valve body sections may be injection molded to reduce costs.

As indicated, in the front face 124 of body section 120 there is a first chamber 130 that includes two water carrying openings 131 and 132 that are respectively connected through passages 29, 128 and 25, 127 which are connected to hot water inlet pipe 28 and cold water inlet pipe 24, respectively.

Figure 3:
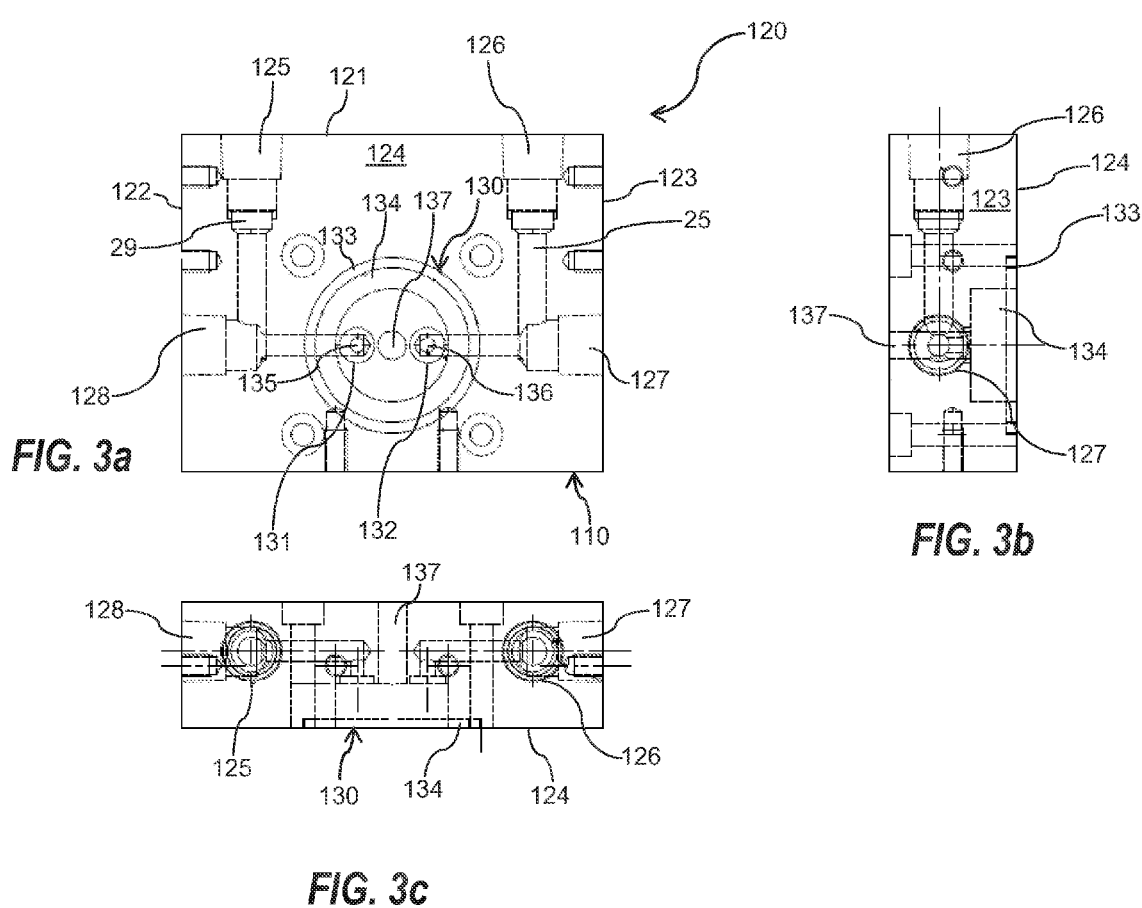
FIGS. 3a, b and c show a front, side, and top view of the section shown in FIG. 2.

Attention is now directed to FIG. 3, where valve body section 120 is shown in a front elevation view FIG. 3a, an end elevation view FIG. 3b, and a top plan view FIG. 3c. Turning first to FIG. 3a, cold water enters the body section 120 through pipe 24 opening 126, and passages 25, 127 shown in phantom lines to opening 132 in first chamber 130. Similarly, the hot water passes through pipe 28, opening 125, and passages 29 and 128 terminating in the opening 131 within first chamber 130. The passage 25 between cold water inlet opening 126 and the passage 29 and first chamber 130 through the opening 127 may be seen best in FIGS. 3b and 3c. Referring to FIG. 3b, first chamber 130 comprises a shallow cylindrical opening 133 and a deeper and slightly smaller diameter opening forming chamber 134. Openings 133 and 134 define, as seen best in FIGS. 3a and b, a shoulder for receiving a sealing member such as an O-ring (not shown). As seen best in FIGS. 3a and b, the primary chamber opening 134 extends inwardly from inner face 124 a distance less than half the thickness of body section 120. Projecting further inward from inner face 124 the openings 131 and 132 communicate with smaller diameter openings 135, 136 that are connected to water passages 127 and 128. Centered in chamber 130 is an additional cylindrical opening 137 for receiving the shaft of a valve (described below) that is, a through-hole from the first chamber 130 to the external face of valve body section 120.

Figure 4:
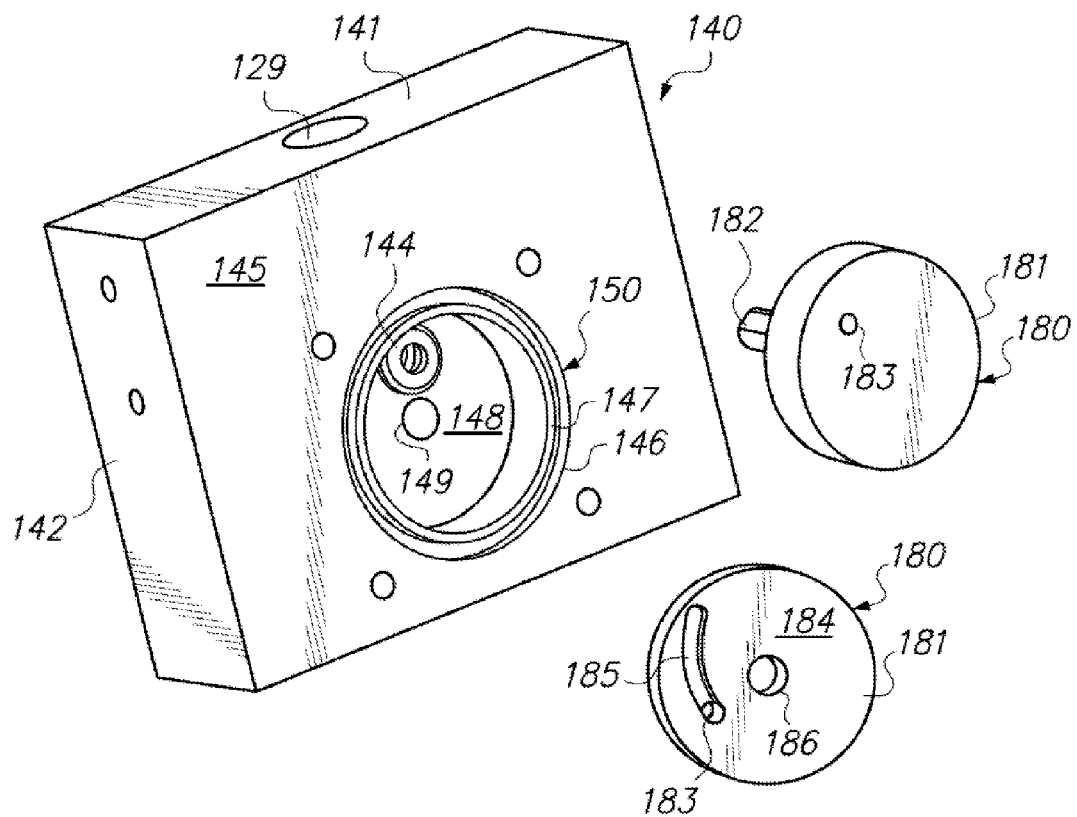
FIG. 4 shows a perspective view of the second or outlet section of the valve body of the embodiment of the present invention together with one embodiment of a cooperating valve.
Figure 5:
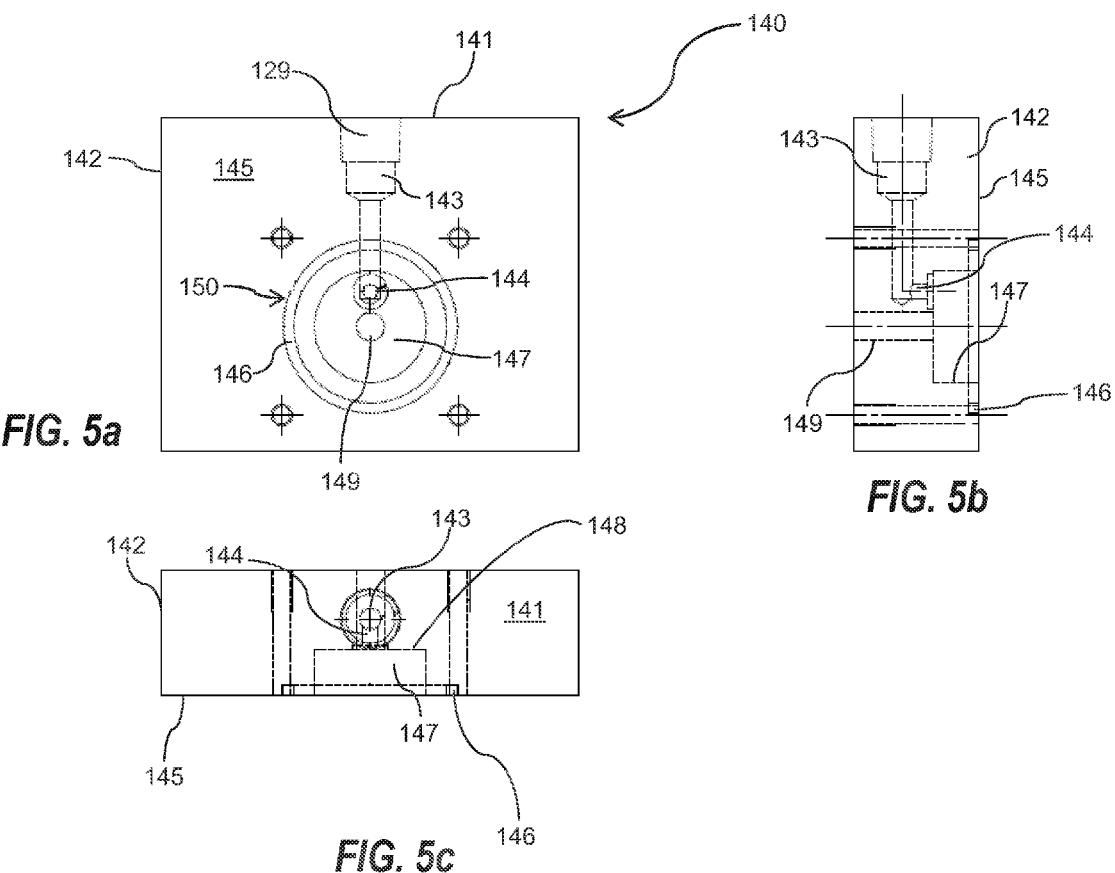
FIGS. 5a, b and c show front, side, and top views of the outlet section of FIG. 4.
Figures 7A, 7B:
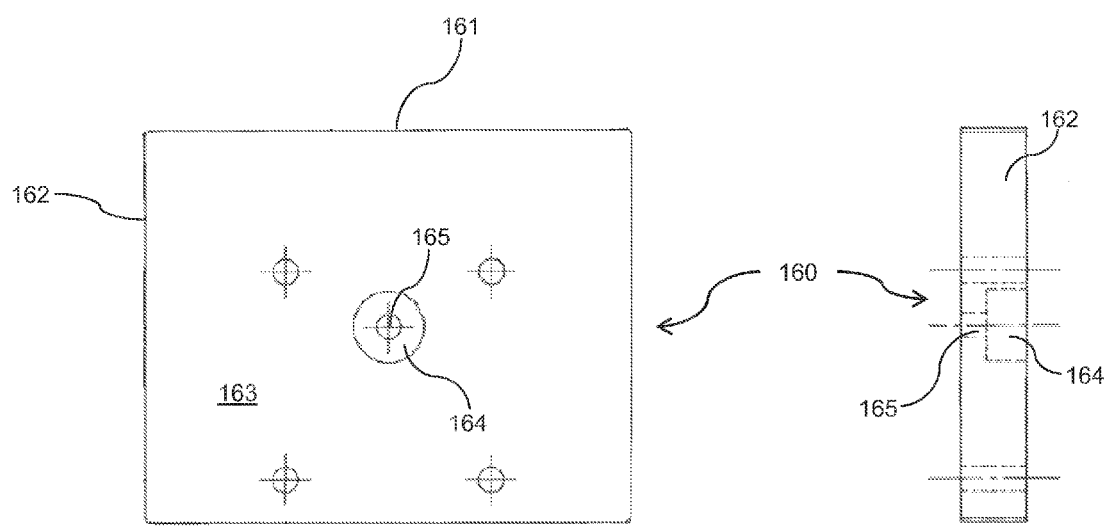
FIGS. 7a and b show a front and side view of the center section shown in FIG. 6.

Directing attention to FIGS. 4 and 5 there is shown a second section 140 that includes a second chamber 150. The section 140 has a top edge 141, and a side edge 142 and may have the same external dimensions as first section 120. The top edge 141 has a single opening 129 for connection to output or outlet pipe 29. Opening 129 connects to vertical passage 143 seen best in FIG. 7a that terminates in an opening 144 in chamber 150. Section 140 has a front face 145 in which there is a chamber 150 including a large shallow cylindrical opening 146 and a slightly smaller in diameter deeper opening 147 that as seen best in FIGS. 5a, 5b and 5c projects from the front face 145 of the block 140 approximately half way through the thickness of the block that forms the main chamber 147. The bottom wall 148 of chamber 147 includes a throughhole 149 for receiving the axle of a valve to be described below.

Figure 6:
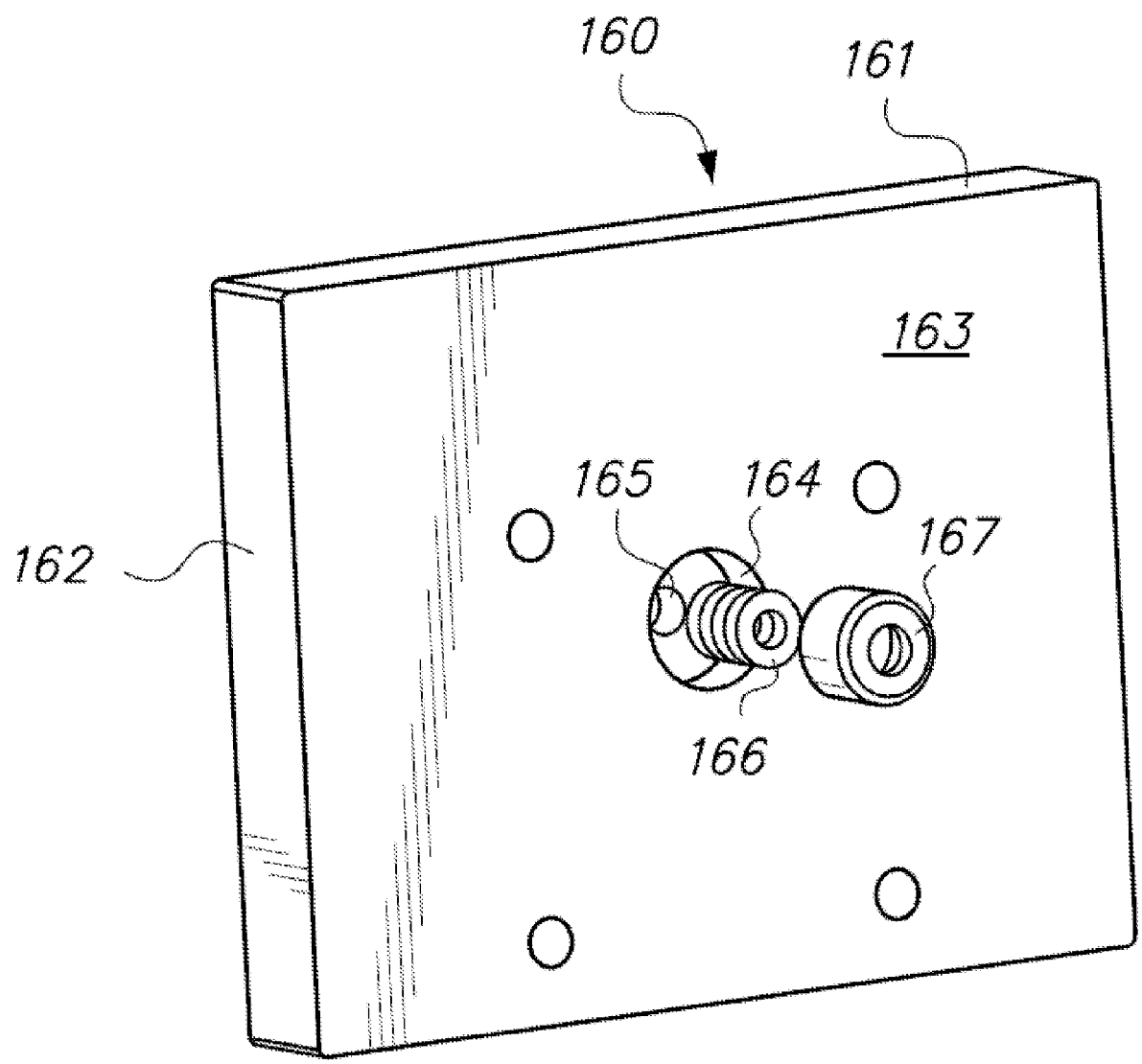
FIG. 6 is a perspective view of a third, or center, section of the valve body of one embodiment of the present invention.

Turning now to FIG. 6, there is shown a center section 160 of valve body 110. Section 160 has a top edge 161 and a side edge 162 and the thickness of the section 160 may be less than the thickness of the first and second sections 120, 140. The section 160 has a face 163 in which there is a cylindrical opening 164 which as seen best in FIG. 7a or b is approximately half way through the thickness of the section 160 and a second opening 165 in fluid communication with the larger opening 164 and passing through the backside of the section 160.

Figure 8:
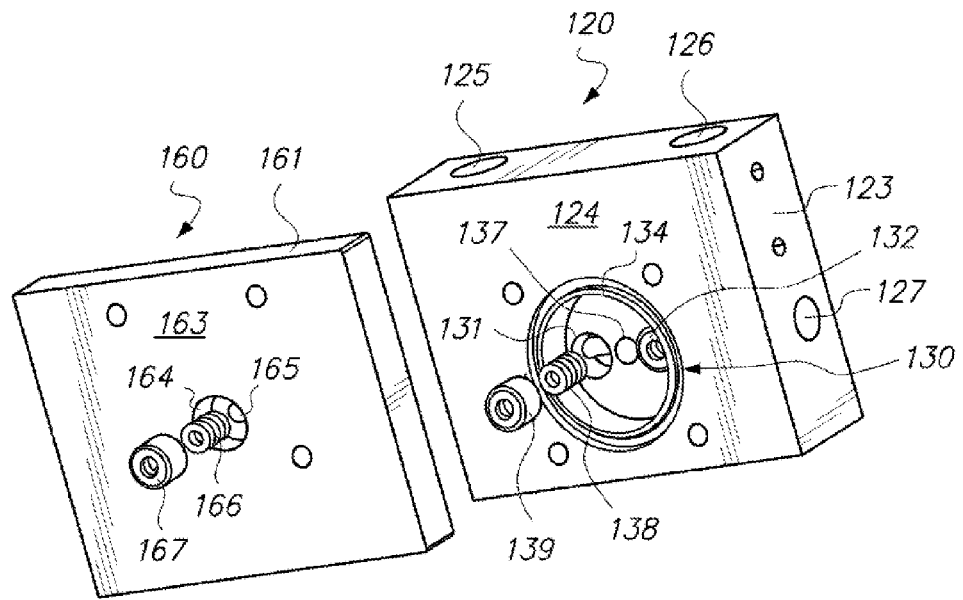
FIG. 8 is a perspective view of the center and first or inlet section of the valve body of the embodiment of the present invention.

The first, second and third sections are fastened together through holes (without reference numerals) through which fasteners pass to assemble the valve block 110. To maintain a tight connection between the faces of the three sections, there is in the opening 164 of center section 160, as seen best in FIG. 8 a spring 166 that is positioned with the opening 164 by a cup washer 167 so that the spring is centered and does not impede the flow through opening 165. Cup washer 167 has a circular opening that is approximately the same size as the internal diameter of spring 166. Accordingly, when section 160 is positioned adjacent to section 140, there is a biasing force between the two sections that is overcome through the fasteners that secure the three sections together in water tight relationship. As shown in FIG. 8, there is similarly a spring 138 and cup washer 139 that biases sections 120 and 160 of valve body 110.

Figure 9:
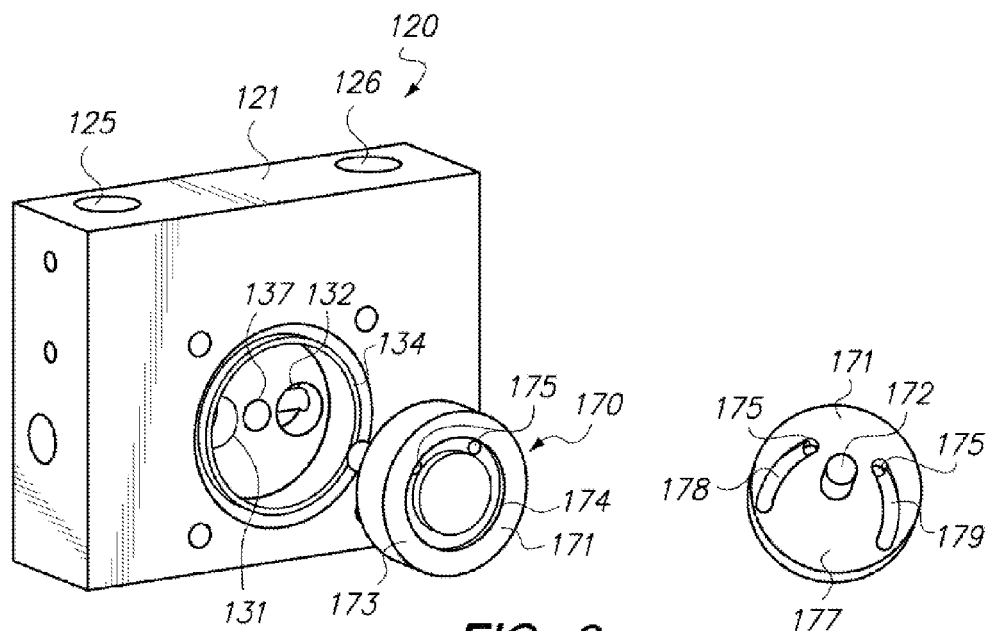
FIG. 9 is a perspective view of the first or inlet section of the valve body of one embodiment of the present invention in an exploded view additionally showing two views of the cooperating valve.
Figure 11A:
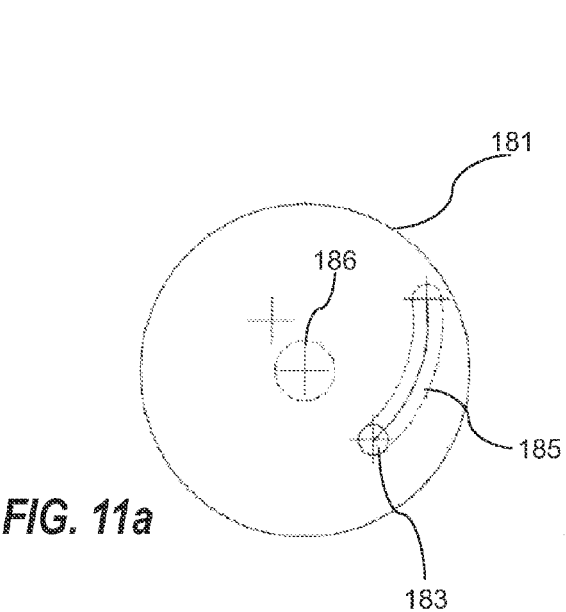
FIGS. 11a; b and c show a front and side views of the valve shown in FIG. 4 with an additional perspective view of the valve.
Figure 11B:
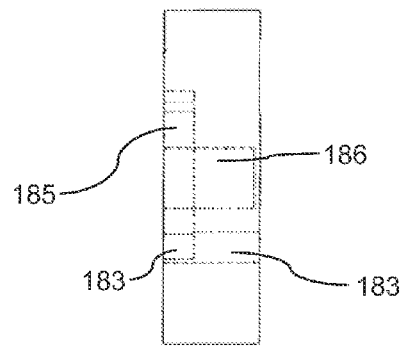
Figure 11C:
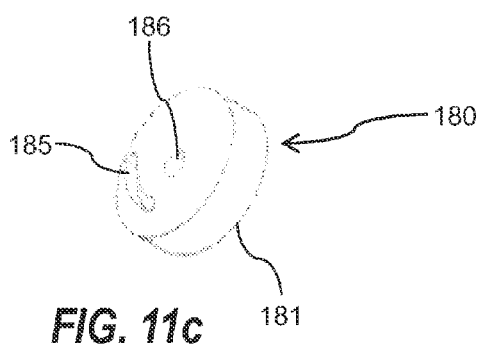

With reference to FIG. 9, there is additionally shown in an exploded view with respect to the first or inlet body section 120, a rotatable valve 170. The valve 170 has a large diameter cylindrical section 171 and an axle or shaft 172. The larger diameter section 171 fits snugly in chamber 134 and includes a circumferential groove 174 in the front face. The opposite face 177 as seen in FIG. 10a that is in contact with the bottom of the opening 134 of section 120 includes two arcuate slots 178, 179 which at one end terminate in openings 175 forming a water passage between the arcuate slots 178, 179 and the circumferential groove 174. When shaft 172 is inserted into opening 137 in section 120, and the cylindrical portion 171 of the valve is inserted into the chamber 134 of section 120, it will be seen that the arcuate slots 178 and 179 will be in fluid communication with openings 131 and 132, depending upon the rotational position of valve 170. One of ordinary skill in the art will then appreciate that as the valve 170 is rotated, the arcuate slot 173 will be in fluid communication with opening 131 which is in connection to opening 125 that is connected to hot water pipe 28. Similarly, and again depending upon the rotational position of valve 170, arcuate slot 178 will be in fluid communication with opening 132 in section 120 and therefore in fluid communication with opening 126 that is connected to ambient water pipe 24. Therefore, depending upon the rotational position of valve 170, all of the water passing through valve 170 may be hot, or may be cold, or may be a mixture of hot and cold. Moreover, the water passages are complementary, that is, as the hot water passage increases, the cold water passage simultaneously decreases until only one of the passages is fully open and the other fully closed. Thus, the ratio of hot to cold water can be varied as desired, to set or regulate the water temperature. It will be understood that it is possible to obtain any desired or regulated water temperature from the hot and cold inlets 125, 126 through section 120 and into center section 160.

As previously explained, section 160 has a smaller opening 165 that is in constant fluid communication with circumferential groove 175 in valve 171. Thus, the water passes through the arcuate openings 178, 179 and through holes 175 and into groove 174 is in fluid communication with the smaller opening 165 and larger opening 164 in middle section 160.

As seen best in FIG. 4, the valve for the second, outlet section 140 is identified at 180 and includes the valve body 181 and a shaft that is inserted into opening 149 in valve section 140. The front face 181 of valve 180 that is in contact with center section 160 has an opening 183 that is radially spaced from the center line of the cylindrical body 181. On the reverse side or mating side of valve 181, there is a face 184 having an arcuate slot 185 that, at one end, communicates with opening 183. Shaft 182 is inserted and fixed in opening 186. It will now be seen that depending upon the rotational position of valve 180, that arcuate slot 185 forms a passage of variable size in body section 140 in communication through opening 183 with the openings 165 and 164 in center section 160.

In summary, water passes from the hot/cold chamber 130 through the valve 170 from either of the openings 131, 132, or both, and through opening 175 from arcuate passages 178, 179 into circumferential groove 176 that is in fluid communication with the opening 165 in center section 160 that communicates through the larger opening 164 in center section 160 and the opening 183 in valve 180 where the water passes into arcuate slot 185 and depending upon the rotational position of valve 180 permits water to pass from slot 185 through opening 144 into passage 143 and outlet 129 into regulated water outlet pipe 29.

It will be understood that various valves, such as ball valves, butterfly valves, diaphragm valves, gate valves, globe valves, needle valves, pinch valves, piston valves, poppet valves, or spool valves, alone or in combination with a like valve, or a valve of another type, may be used as a valve assembly in the system providing that the valves include two chambers and two valves that operate dependently, to selectively connect two water inlets at ambient and elevated temperatures to a first chamber and connect water from first chamber to a second chamber selectively connecting second chamber to a single water outlet. It will be also understood by one of ordinary skill in the art that the particular mechanical configuration of the valves used in the present invention is not important so long as the two valves are complementary in the sense that the valve movements are coordinated so that as one water passage is increased the other is commensurately decreased thereby permitting a ratio of hot to cold that is 1:0 or conversely, 0:1. The second characteristic of the valves, as in the valve embodiment described above, is that the passage for the hot and cold water may be varied and, as in the above exemplary embodiment, the arcuate slots are arranged with respect to the axis of the valve such that one end of the slot is radially closer than the other end of the slot so that as the valve is rotated the size of the passage increases or decreases.

Moreover, the water delivery system 1000 may operate in a valve assembly bypass mode by creating a dual or second passage from the cold water inlet to the valve assembly as shown in FIG. 1 and directly to a water fixture inlet thereby assuring that cold water is always available at the fixture spout. Alternatively, in addition to the cold water bypass mode, the controller may be temporarily latched so that the valve assembly, in the bypass mode permits only hot water to the second chamber where the second chamber valve is set to maximum flow rate to water fixture 10 whereby the elevated temperature water may be mixed with the cold water at the fixture, rather than by the inoperative or deactivated valve assembly, and controlled in temperature and flow rated by the fixture handle. As a second alternative to operating in the bypass mode with both hot and cold water available at the water fixture 10, the valve assembly may be provided with a hand-operated knob mounted exterior of valve body 110 on valves 170 and 180 shafts 172 and 182 thereby allowing the user to manually set the inlet section to the maximum hot position and set the outlet section to the maximum flow condition resulting in hot water appearing at one net 29 from the valve assembly 100 while cold water enters through water inlet 22 so that both the hot and cold water may be mixed in temperature and in flow rate by operation of the handle 12 which combines the two water flows in the enclosure of body 16 before exiting from spout 14.

Controller-First Embodiment

The water delivery system of the present invention as disclosed in the embodiment of FIG. 1 includes a controller 400. Applicant has invented unique specific embodiments of a controller, but as will be understood by those of ordinary skill in the art, various types of controllers may be used in the water delivery system embodiment of the present invention. A first embodiment of a controller will now be described and attention is directed to FIG. 12, an exploded view of a foot-operated pedal controller. As will be appreciated from FIG. 1, the controller is an electromechanical assembly in which mechanical movement of a foot-operated pedal are converted to electronic signals that are connected to power source 300 that operates transmission device 200 and valve assembly 100. A foot-operated pedal controller has the obvious advantage of permitting a user of a water delivery system to hands-free operate the system, to regulate both temperature and volume of flow, from the spout 14 of the water fixture 10. As will be later explained, the operator's motions of a foot pedal are converted through electrical sensors to an electrical signal or signals to one or more power sources 300. It will be understood, however, that the mechanical motion could be converted to hydraulic, pneumatic or other fluid pressure that may actuate the transmission device 200 and therefore the valve assembly 100 that regulates both water temperature and volume from spout 12.

Figure 12:
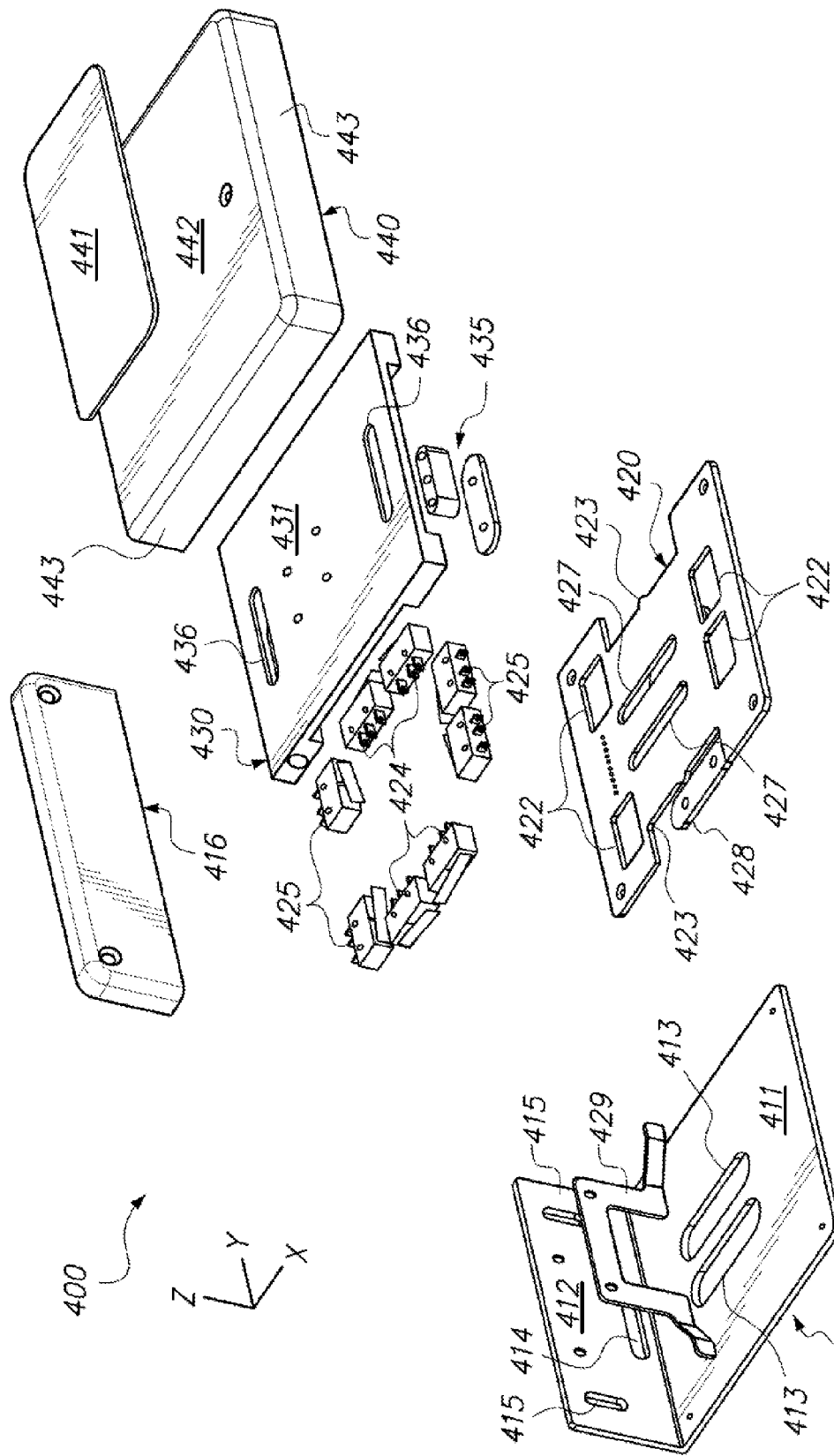
FIG. 12 is an exploded view of a foot pedal assembly embodiment of the present invention.
Figures 13A, 13B:
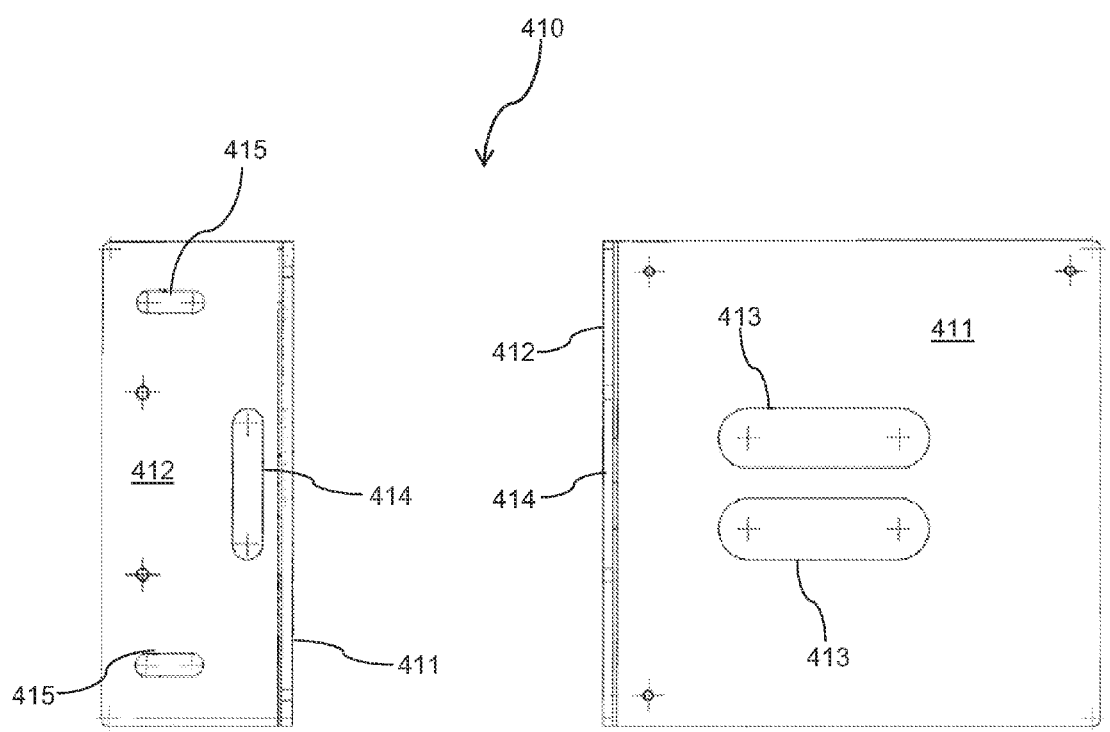
FIGS. 13a and b show a top and side view of a base plate of the pedal assembly embodiment shown in FIG. 12.

As seen best in FIG. 12, this embodiment of controller 400 comprises a base 410, a first guide plate 420, a second guide plate 430 and a movable foot pedal 440. The base 410 as seen in FIGS. 13a and b, comprises an L-shaped member having a horizontal portion 411 and a vertical portion 412 (vertical portion 412 services as a reference plane for the following description). The horizontal portion 411 includes two identical elongated slots 413 for a function described below. The vertical portion 412 includes, proximal to the base plate 411, a horizontally disposed elongated slot 414. The vertical portion 412 also has, proximal to the upper edge, two identical vertically disposed elongated slots 415 which cooperate with a vertical base plate cover 416 that fits over the vertical portion 412 of the base plate providing a suitable aesthetic appearance. Base plate cover 416 may be made from various materials including plastic, metal or a composite. Cover 416 has two openings through which screws may be placed that pass through slots 415 in the vertical portion 412 of the base plate 410 allowing the cover 416 to be vertically adjusted relative to horizontally disposed base plate 411.

Figure 14:
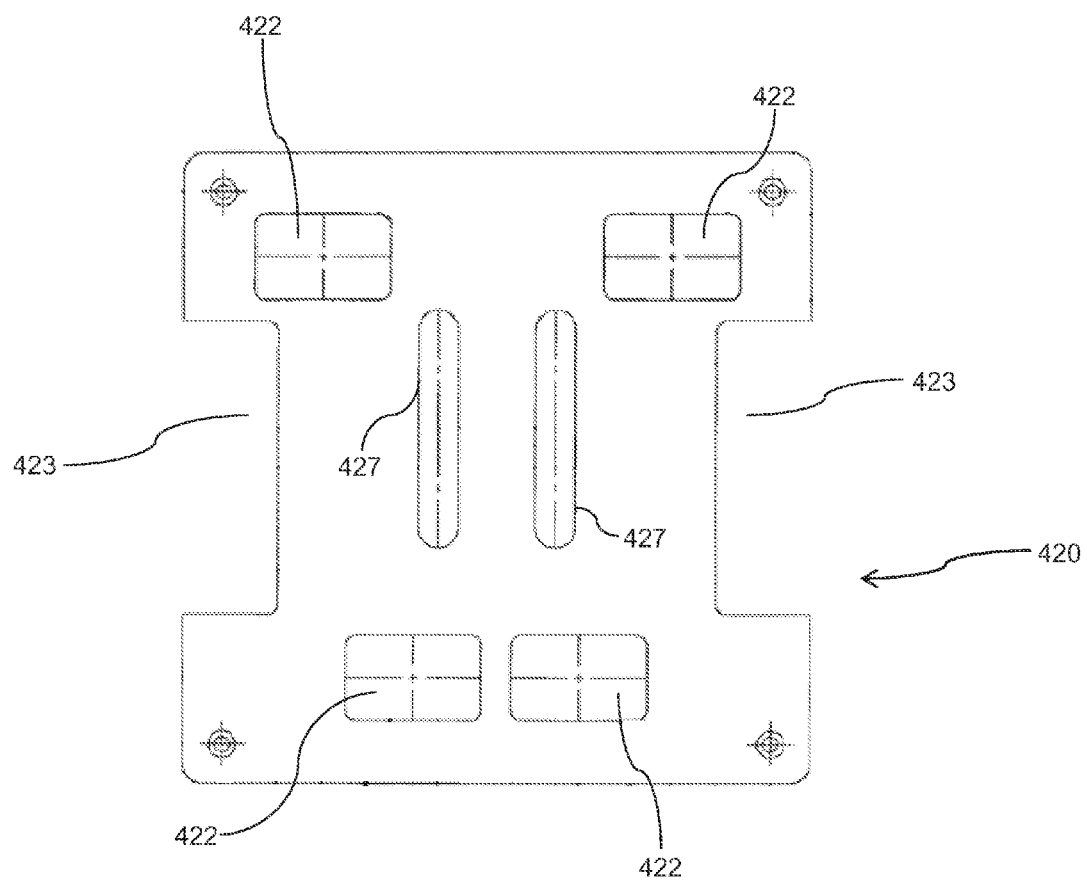
FIG. 14 shows a plan view of a first slide plate as shown in FIG. 12.
Figure 15:
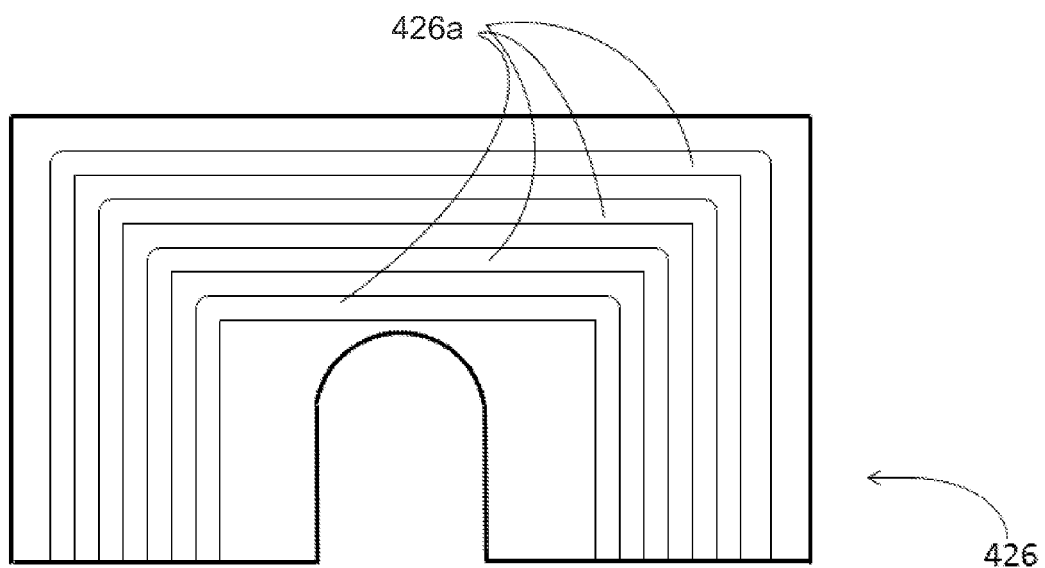
FIG. 15 shows a circuit board for mounting on the slide plate of FIG. 14.
Figure 16:
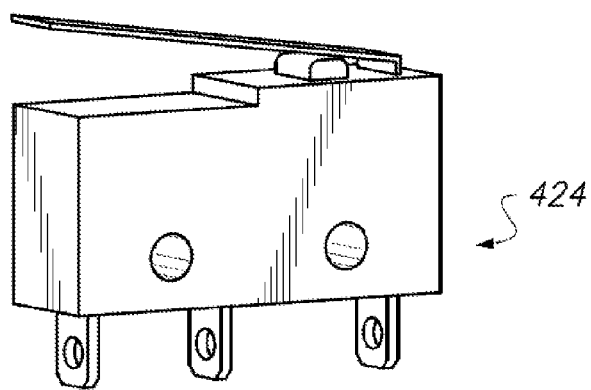
FIG. 16 is a perspective view of a pressure sensitive contact switch.
Figure 20:
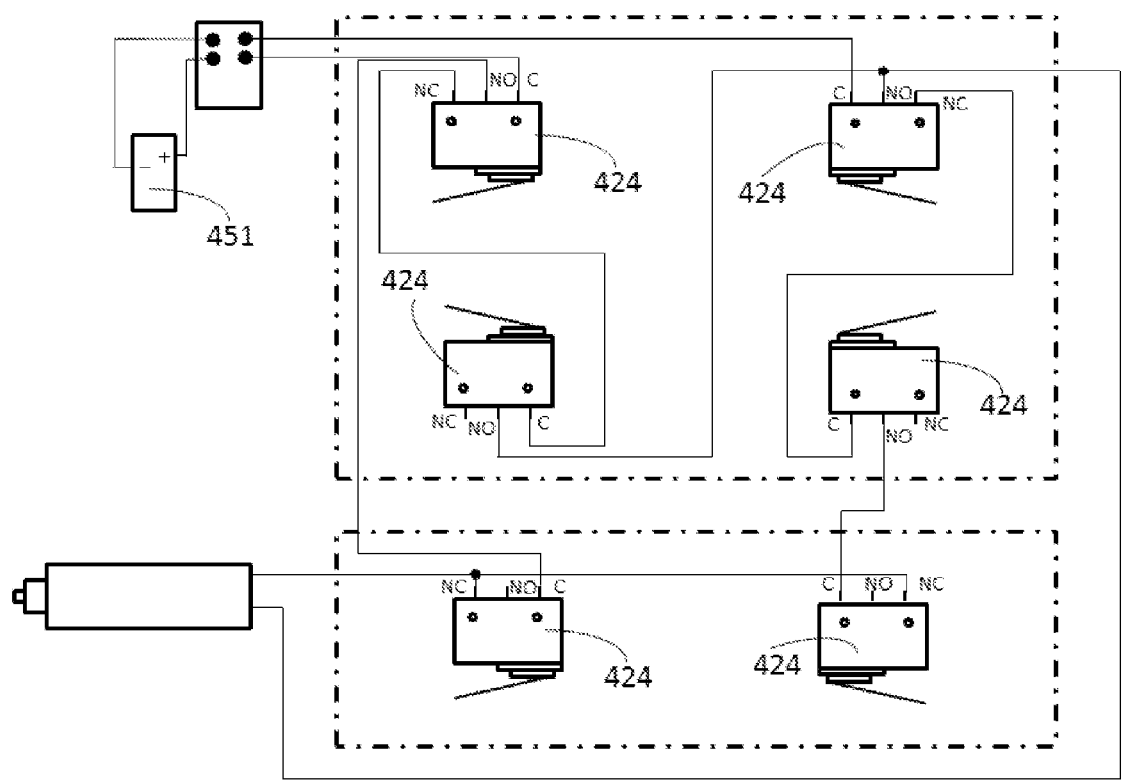
FIG. 20 is a diagrammatic schematic view of a circuit for the foot pedal assembly shown in FIG. 12.
Figure 21:
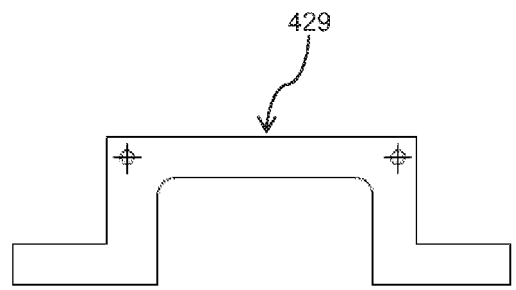
FIG. 21 is a front view of a resilient member as shown on FIG. 12.

Mounted above the base plate 411 is a first guide plate 420, shown in FIG. 14, that is slidably mounted on base plate 411. Guide plate 420 has secured to its upper surface a printed circuit board 426 having a plurality of conductive traces as seen in FIG. 15 for the purpose described below. Guide plate 420 has four rectangular openings 422, two long opposed edge cut-out portions 423 and two spaced apart parallel slots 427. First guide plate 420 and the circuit diagram carried thereon cooperate with a series of off-the-shelf electrical contact (pressure) switches 424, 425, one of which is shown in FIG. 16 in greater detail. Four of the contact switches, 424, are mounted on base plate 411, two within the cut out 423 on one edge of the guide plate 420, and the other two in the opposing cut-out 423 along the opposite edge. The other four contact switches 425 are also mounted to base plate 411 and are positioned within and project through the openings 422 in first guide plate 420. All of the electrical pressure switches are identical, though wired differently, and as seen in FIG. 20; each has a resilient member which cooperates with a push button and internally includes a circuit connected to the three external plugs or wiring elements to create normally open or normally closed switches in a manner well known in the art. The circuit diagram defined by the printed circuit board 426 cooperates with the conductive traces of the electrical, pressure-sensitive contact switches 424, 425 in a manner well known in the art. The circuit is described in greater detail below in conjunction with a description of the motion of the foot pedal 440.

Figure 17:
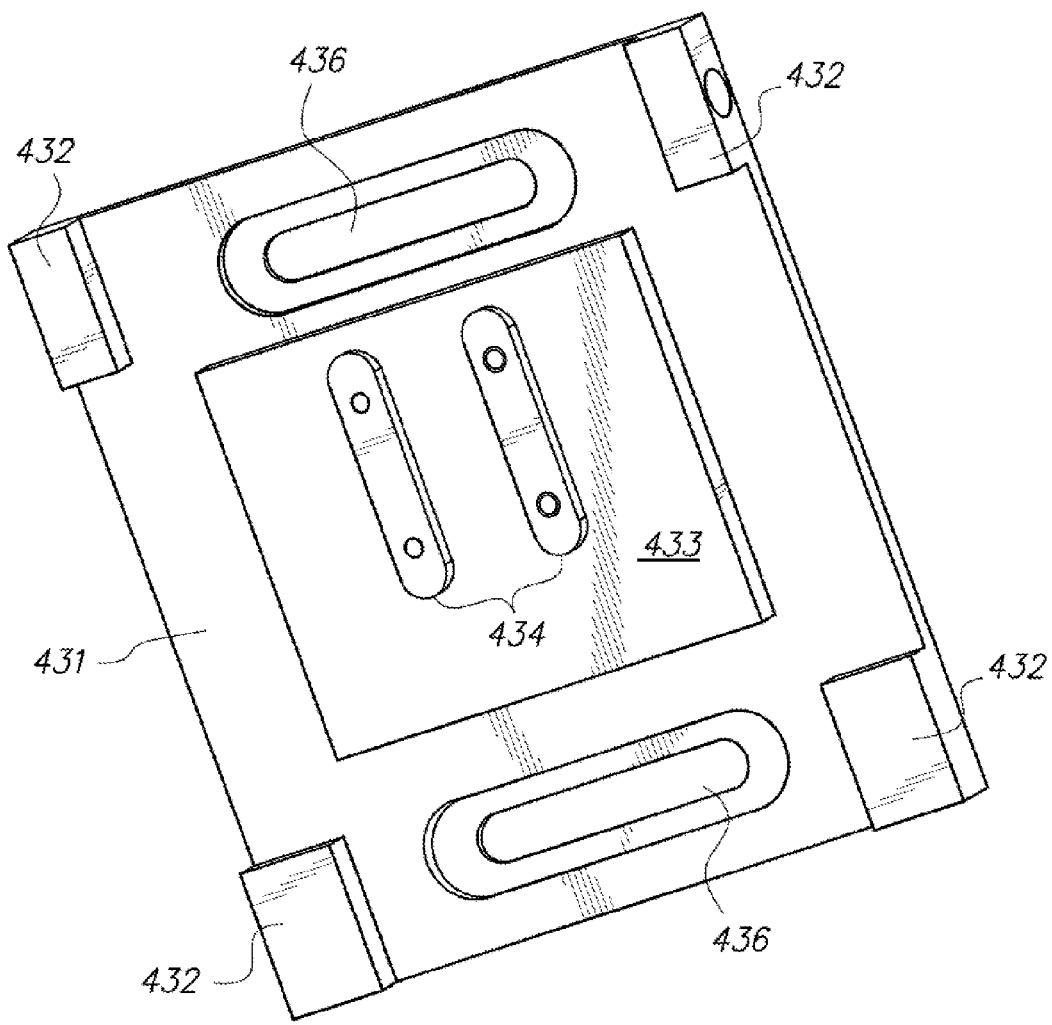
FIG. 17 is a bottom perspective view of a second slide plate as shown in FIG. 12.

Mounted above first guide plate 420 is second guide plate 430 that is additionally shown in FIGS. 17 and 18, the former providing a bottom perspective view of second guide plate 430 and the latter providing plan and side elevation views of the plate. Guide plate 430 comprises a substantially flat plate 431 having four feet 432, a central rectangular raised member 433 that may be integral with plate 431 and projects downwardly when the controller is fully assembled. Two elongated projections, buttons, or slides 434 are fixedly mounted on or integral with member 433 and project further downwardly; slides 434 are received in and constrained by the slots 427 in first guide plate 420. Anchor members 428 are fastened to the bottom of slides 434 beneath guide plate 420 in the slots 413 in base plate 411. It will therefore be appreciated that first guide plate 420 is movable toward and away, i.e., fore and aft, from the vertical portion 412 of base plate 410 and is constrained in both the horizontal direction, that is, to the left and right as shown in FIG. 12 but is slidably movable though constrained by the operative engagement of the slots 427 and 413 and the anchor members and slides 428 and 434.

Secured to the bottom of foot plate 440 are slides comprising anchor 435a and slide 435b, one of which is shown in FIG. 12 and in 19. Slide 435a is secured to the bottom of foot plate 440 and projects downwardly through one of the slots 436 in second guide plate 430; the anchor 435b is slidably mounted below openings 436 and slide 435a is constrained in slots 436 in the bottom of second guide plate 430 permitting side-to-side movement of foot plate 440, that is, parallel to the vertical portion 412 of base plate 410 permitting translation of foot plate 440 orthogonally to the movement of guide plate 430 (that is, toward and away from the vertical portion 412 of base plate 410 as described immediately above). A similar slide and anchor 435a and 435b projects through the slot 436 that is proximal to vertical portion 412 of base plate 410 and further provides guided movement of foot plate 440.

Foot plate 440, made of metal, plastic or composite aesthetically pleasing material, has a flat upper surface 442 and depending sides 443 that may be formed integrally with the flat top plate 442. When the foot plate 440 translates left or right as above described, the depending walls 443 will contact or release from the resilient contacts of the electrical contact switches 424 and 425, so as to actuate the switches, opening or closing a circuit on PCB 426, that controls signals to power source 300. In one embodiment, base plate 410 may include at its left edge, a latch (not shown) that cooperates with a catch (not shown) on the left edge of foot plate 440 so that when foot plate 440 is moved to the aft position and to the maximum left position, the foot plate rests in the OFF position, in the hot condition so that in the BYPAS/OFF mode, water at the elevated temperature is available when the foot plate is moved to the ON position or provides hot water in the bypass mode as described above.

Turning now to FIG. 20, there is shown a schematic wiring diagram for the electrical contact switches. The circuit 450 is powered by a battery 451 through the traces on printed circuit board 426 on first guide plate 420 and is connected as shown to the pressure sensitive switches 424, 425 which may be wired so as to be normally opened, or normally closed. The output of switches 424, 425 is electrically connected to power source 300, in this embodiment, electrical motors, as will be more fully described below. Eight pressure switches 424, 425 are shown I FIG. 12, though six switches, as shown in FIG. 20, may be sufficient for proper operation of the valve assembly.

Vertical plate portion 412 has mounted thereto an inverted U-shaped resilient member 429 having a pair of arms such that when the U-shaped member is attached to vertical member 412, the arms bias second slide plate 430 away from vertical portion 412.

In mechanical operation, the foot plate 440 is movable or translatable in the X-Y directions and for purposes of explanation, movement along the X axis is described as movement from left to right or right to left, while movement along the Y axis is described as fore and aft movement. When the controller 400 is in an inactive position, foot plate 440 may be centered along the Y axis and in its full aft position. As the foot plate 440 moves, for example, to the right along the X axis, as viewed in FIG. 12, the depending wall 423 on the right side of foot plate 440 will disengage from the resilient members of the right side switches 424 this sending or terminating a first signal to the power source 300. The foot plate 440 movement along the X axis motion is limited by the slide and anchor 435a and 435b in operative engagement with slot 436. Conversely, if the foot plate 440 is moved to the left, as viewed in FIG. 12, the depending side wall 423 will disengage from the resilient members of the opposite pair of switches 424 thus again sending or terminating a signal to power source 300.

The foot plate 440 may also be moved along the Y axis. Its initial or rest position is such that the foot plate 440 is biased distally from the vertical portion 412 of base plate 410. In that position, the second guide plate 430 rectangular member 433 is disengaged from the resilient members on the pair of contact switches 425 that are proximal to the vertical wall portion 412 of base plate 410. This rest position is defined by the biasing force of the resilient member 429. As the second guide plate 430 is moved toward the vertical wall portion 412 along the Y axis, the rectangular member 433 will disengage the distal pair of pressure switches 425 and engage the pressure switches 425 that are proximal to the vertical portion 412 of base plate 410 thus providing or terminating a second signal to power source 300.

In the water delivery system of the embodiment of this invention, the controller 400, in the foot-operated pedal subassembly embodiment is electrically connected so that movement along the X axis will send a first signal to a first power source, while movement along the Y axis will send a signal to a second power source. The power sources will control the valve assembly 100 such that movement to the right along the X axis of foot plate 440 will open the cold water inlet in valve assembly 100. Conversely, movement to the left of foot plate 440, from its central rest position, will permit hot water to enter into valve assembly 100. Thus, the temperature of the water that may pass through the valve assembly 100 is regulated by left-right movement of the foot plate 440 of the controller 400 embodiment.

Movement of the foot plate 440 along the Y axis, will control the volume or flow rate of water through the valve assembly 100 by appropriate actuation of the second power source. The foot plate 440 in its rest position corresponds to shut off of the volume of water otherwise passing through valve assembly 100, in other words, it is in the OFF position. As the foot plate 440 is moved toward the vertical wall portion 412 of base 410 along the Y axis, depressing biasing member 429, flow will increase through the valve assembly through outlet pipe 29 to provide regulated, that is, temperature controlled and volume or flow rate controlled water delivery to conventional water fixture 10. If foot pressure is removed from foot plate 440, resilient member 429 moves the foot plate 440 along the Y axis away from vertical portion 412 of base plate 410 thus providing automatic shut off of water flow through valve assembly 100. It will also be understood that the two translations of foot plate 440 are operatively connected such that, for example, the foot plate may be moved to the left, thereby opening hot water inlet 125, 29 and 128 into the valve assembly 100, and then translated along the Y axis to control the flow of the water at the elevated temperature. Any combination of water temperature and water flow rate may thus be controlled through the foot-operated pedal assembly embodiment 400.

When the controller 400 is activated by the user, it operates the valve assembly 100 allowing cold water to flow through pipe 24 through valve assembly 100 and, when desired, is mixed with hot water in valve assembly 100 to produce a regulated water output at 29 thus giving hands-free control of both water volume and temperature. In that case, cold water through pipe 22 does not pass through mixing chamber 16 of conventional water fixture 10. Thus, the water delivery system of the present invention as shown in the embodiment described above of the valve assembly 100 and the controller 400 will operate in a bypass mode, as indicated above, but may also be operated in a complete hands-free mode providing a regulated water supply with respect to both temperature and volume. Detailed description of the various modes of operation of the water delivery system of the present invention as exemplified by the embodiment herein is described is in the following section.

System Operation

Figure 29:
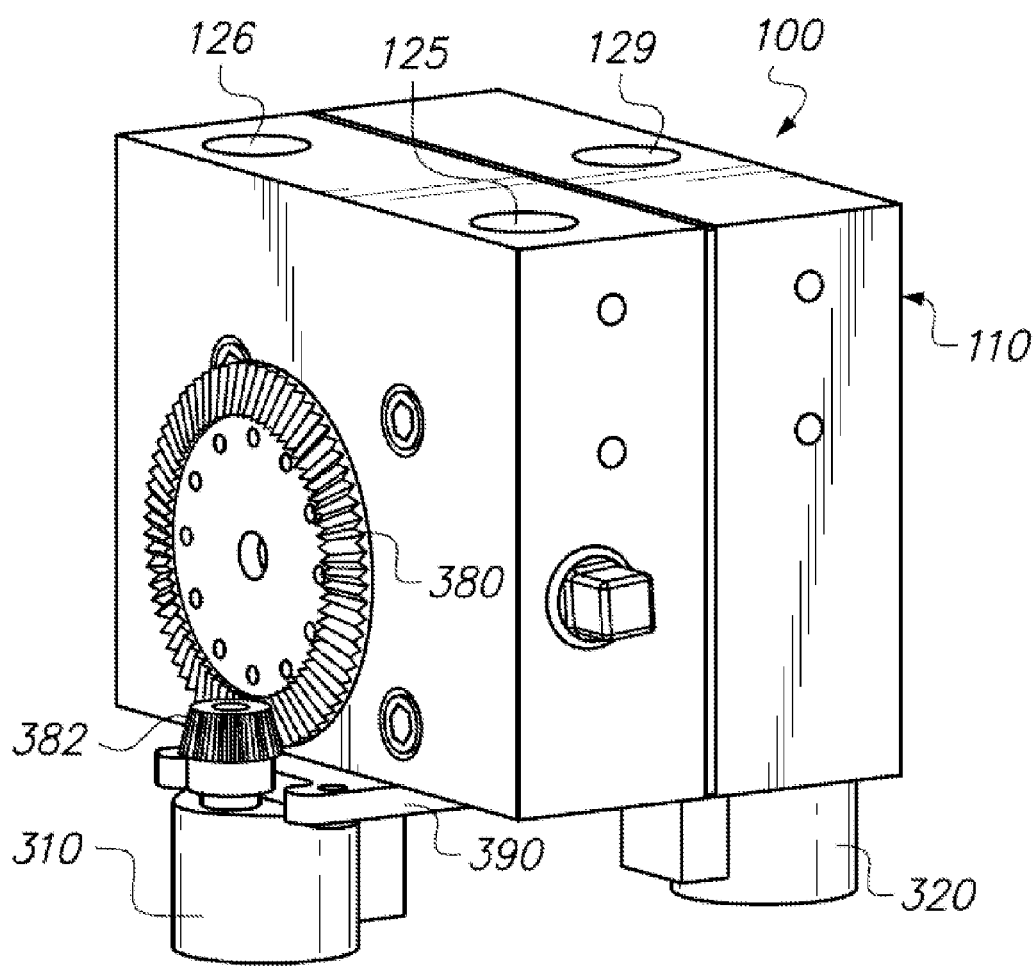
FIGS. 29 is a perspective view of a second embodiment of a power source and transmission mechanism in cooperative engagement with a valve body assembly.
Figure 30:
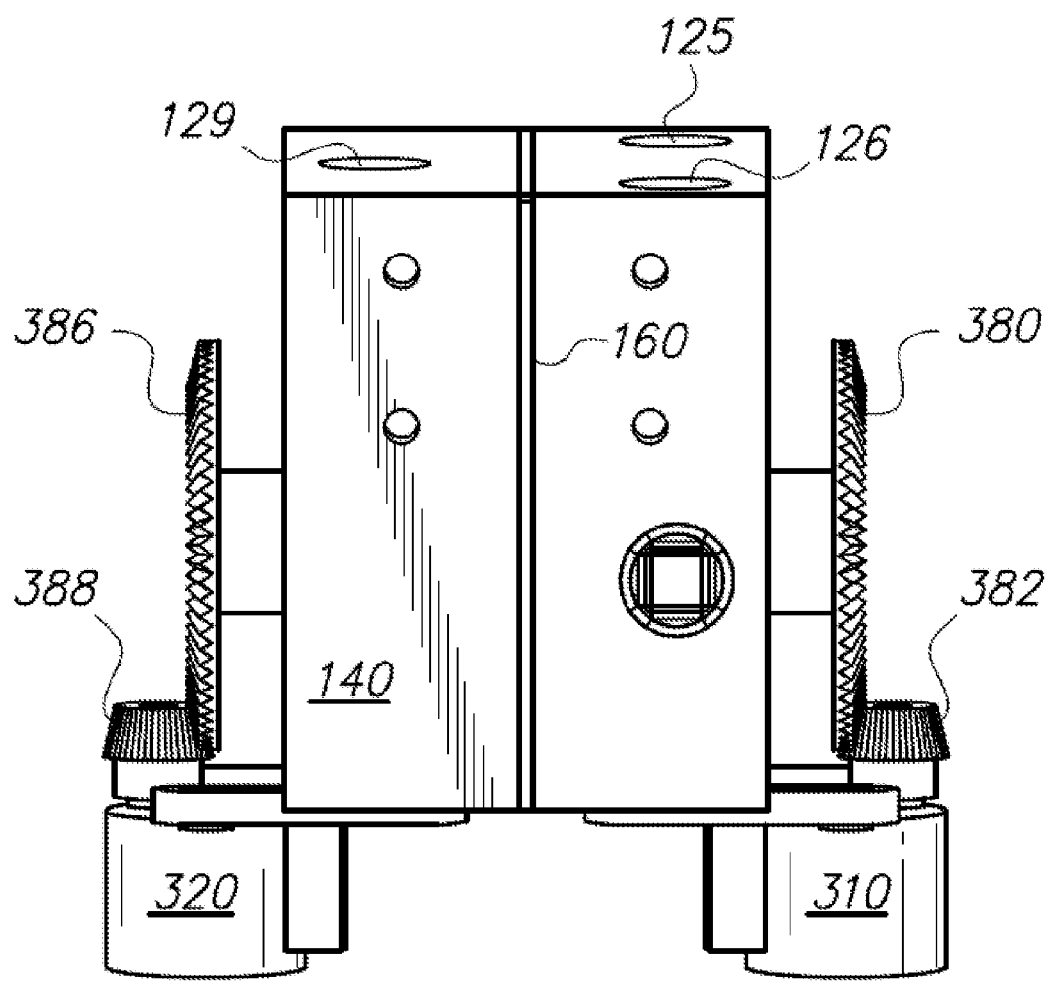
FIGS. 30 is a second view of FIG. 29.

Operation of the embodiment of the water delivery system of the present invention will now be described in conjunction with FIGS. 29-30. Each of these figures, on the left-hand side, diagrammatically illustrates the position of a movable foot pedal controller (such as described below), relative to a base, along the X and/or Y axes. On the right hand side of each figure is a diagrammatic illustration of the water flow from a conventional water source, one cold inlet and one hot inlet, through a valve assembly or directly into the water fixture. The water fixture for purposes of this description includes a base 18, a mixing chamber 16, a spout 14, and a handle 12; in all modes the handle is closed. The valves are illustrated schematically by a symbol of two triangles connected at a point; if the valve is open, the triangles are white indicating that water may pass through the valve; if the triangles are black, it indicates that the valve is closed and that no water may pass therethrough. There are three valves in the valve sub-assembly. Valves V1 and V2 control the temperature of the water that reaches the water fixture. Valve 3 controls the volume or rate of flow to the water fixture. Heavy black lines indicate that there is an open flow connection or communication for transporting water from one point in the system to another; the lighter line indicates a path, such as a pipe, through which no water is flowing. The output of valves V1 and/or V2 is connected to the input of the flow control valve V3. The dotted lines within the valve assembly between the valve V1 and V2 indicate that the two valves are operated in tandem or in coordinated or complementary operation such that one valve may be completely open and the other closed, or both valves may be partially opened as will be described and as one valve is progressively opened, the other is progressively closed.

The controller 400, may be of the foot-operated pedal type previously described, though other types of controllers or user-input devices may be employed as later described; the controller is shown diagrammatically by a first rectangular box identified as "base," and a movable foot pedal schematically represented by a second rectangle that lies above the base, and as will be described, is movable left and right as well as fore and aft. Movement of the foot pedal relative to the base along the X axis controls the valves V1 and V2 and the temperature of the water that will reach the water fixture. Movement of the foot pedal fore and aft along the Y axis controls the flow volume valve V3.

In FIG. 27, the system is shown in the OFF/BYPASS mode. The controller is shown with the foot pedal in the fully aft position which closes valve V3 so that water does not reach the water fixture through the valve assembly. The foot pedal is shown centered along the X axis indicating that valves V1, V2 may be either open or closed since their output is terminated at valve V3. Movement of the foot pedal to the right or left has no effect when the pedal is in the aft position and the system is OFF. The difference between the two modes is that in the BYPASS mode, it may be desirable to allow the user to operate the water fixture as if the valve assembly was not interposed between the hot and cold inlets and the fixture. Therefore, valve V3 is closed but cold or ambient water is still available at the fixture that may be hand operated. Hot water passes through valve V1 and valve V1 within the valve assembly but is delivered to the water fixture by valve V3. Alternatively, as previously described, the foot pedal may be latched in the hot and open position so that hot water passes through valves V1 and V3 and both hot and cold water may be available through handle 12 of the water fixture so as to manually operate in conventional fashion selecting cold water and/or hot water that flows into the mixing chamber 16 by rotational movement of the handle 12 and the flow rate by up and down motion of handle 12.

FIG. 28 illustrates the system in the HOT mode. The foot pedal is moved to its fore position along the Y axis and moved to its fully left position along the X axis. This positioning opens valve V1, closes valve V2, and opens valve V3 such that hot water at maximum temperature reaches the water fixture. The temperature may be regulated by positioning the foot pedal between the fully left position and the center position; the intermediate temperature is obtained, for example, from the maximum temperature position, by partially closing valve V1 and simultaneously opening valve V2. Simultaneous movement is achieved by mechanical interconnection between the valve positions. If, for example, the valve is in the neutral position, i.e., warm water, initial movement to the right of the foot plate will increase the amount of cold water thus lowering the temperature of the regulated water supply.

The COLD mode of system operation is shown in FIG. 30a. The foot controller, as shown, is moved to the fore position along the Y axis thereby opening valve V3 and simultaneously moved to the full right position where the valve V2 is open and valve V1 is closed. Consequently, as seen in the diagrammatic figure, the valve assembly terminates hot water within the valve assembly while the path for cold water is twofold, through the direct path and simultaneously through the valves V2 and V3 which are in the open position. In this position, only cold water reaches the water fixture and will provide the maximum cold water temperature. That temperature may be adjusted by changing the foot plate position and therefore the valve assembly valves V1 and V2.

Also in FIG. 28, the system is shown in the MIXED or regulated mode. As shown, the foot pedal is in the fore position along the Y axis indicating that valve V3 is open. The foot pedal is centered on the X axis thereby setting valve V1 and V2 to the partially open positions. Accordingly, the water passing through valve assembly to the water fixture is regulated both as to temperature and flow.

It will be understood that in the diagrammatic figures shown, the foot pedal is in the complete fore or aft position along the Y axis indicating maximum flow rate or zero flow rate. It will be understood that the user may control the foot pedal position along the Y axis between full flow and no flow such that the flow may be regulated at whatever flow rate is desired.

It will now be understood that the system operation permits complete hands-free, foot control, or alternatively, in a BYPASS mode, permits the water fixture to be operated in a conventional manner. It should also be noted that the position of the foot pedal along the Y axis, as a result of a biasing force, will move to the aft position where valve V3 is closed and thus removal of the operator's foot from the foot pedal will immediately turn the system to the OFF position as shown in FIG. 29a.

Power Source

Figure 22:
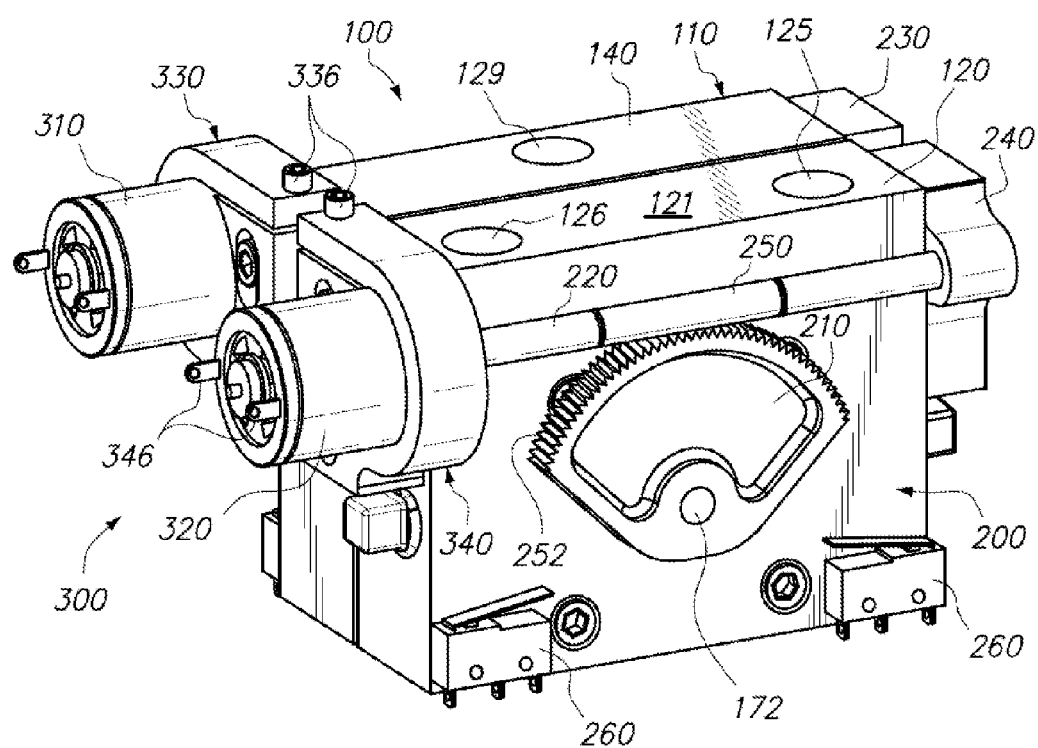
FIG. 22 is a perspective view of one embodiment of a power source and transmission mechanism in cooperative engagement with a valve assembly body.
Figure 24:
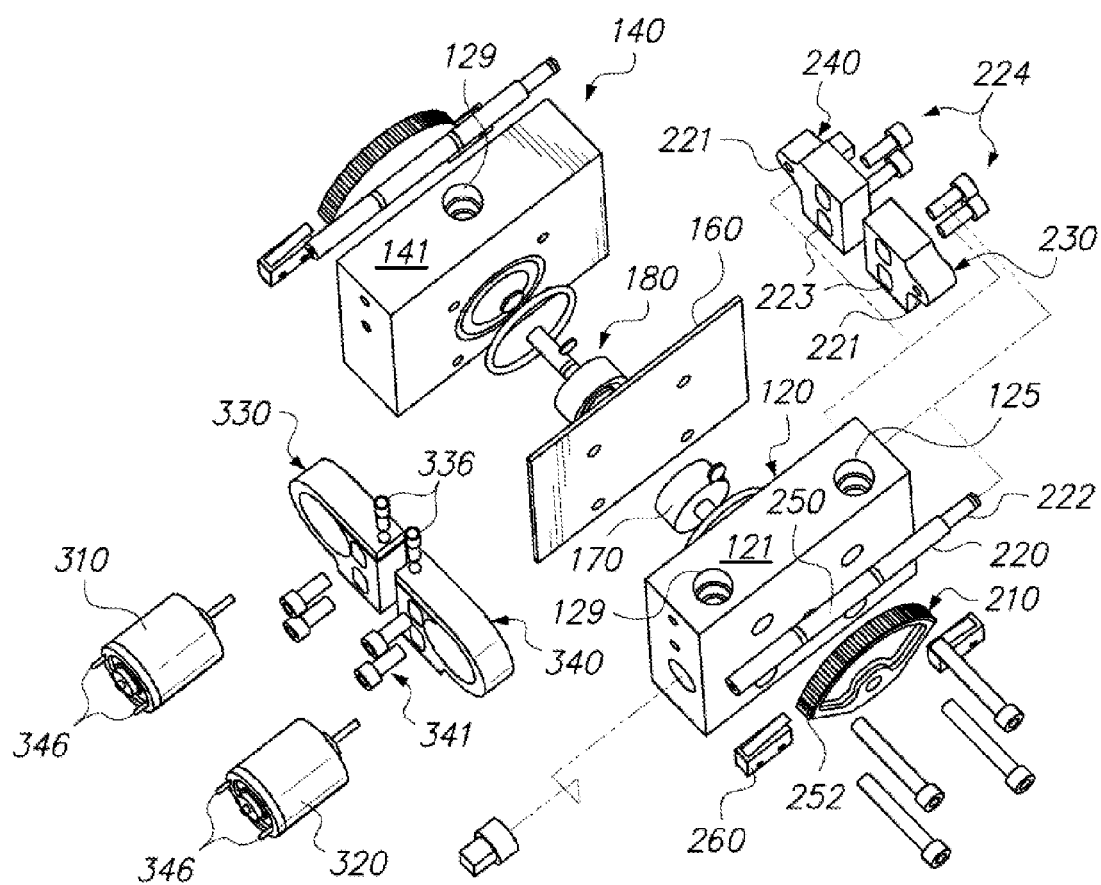
FIG. 24 is an exploded view of the valve body assembly, the power source, and the transmission gear assembly of one embodiment of the present invention as shown in FIGS. 22 and 23.
Figures 25A, 25B:
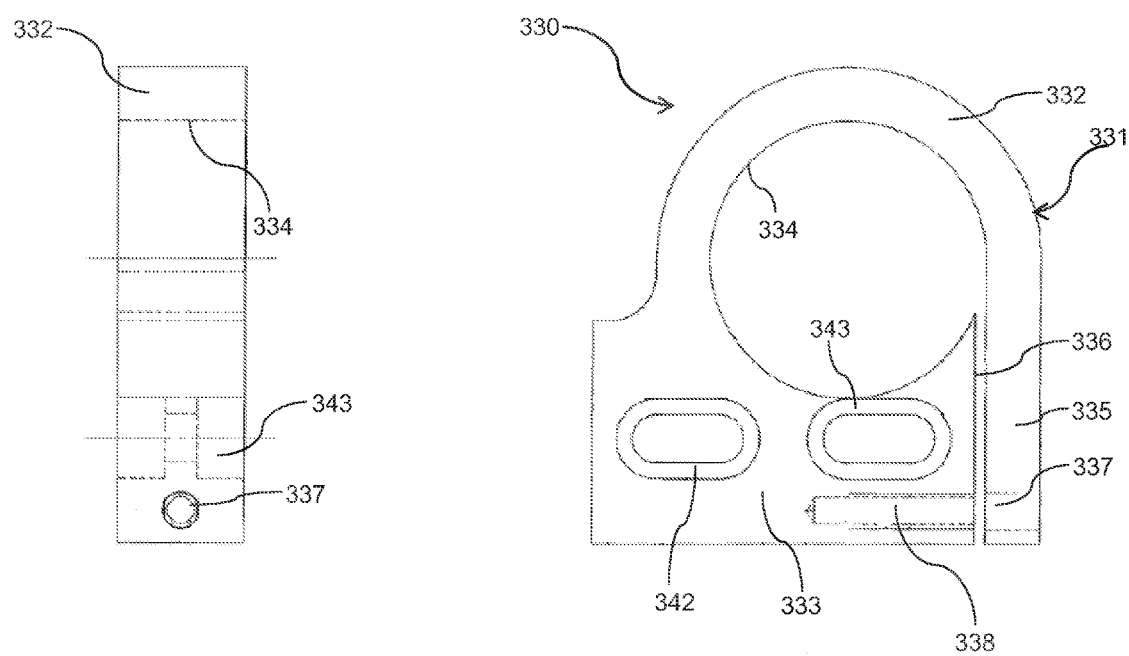
FIGS. 25a and b show a front and side view of a motor mount for one embodiment of the power source of the present invention as shown in FIGS. 22-24.

In the system described in connection with the embodiments as herein set forth, the power source 300, operatively connected to controller 400 comprises two electric motors 310 and 320. The complete system is shown in one embodiment of the invention in FIG. 22. FIG. 22 is a perspective view and a second perspective view is provided in FIG. 23 which well illustrates all of the sub-assemblies and components that are external to valve assembly block 110. The motors 310 and 320 are conventional and procured off-the-shelf. Motors 310 and 320 are secured in motor mounts 330, 340, respectively. Motor mounts 330 and 340 are shown in FIG. 24, an exploded view of this embodiment of the invention, and is additionally shown in FIGS. 25a and 25b. Motor mounts 330 and 340 are identical and are mounted on valve block 120 and 140, respectively. Referring now to FIGS. 25a and b, the motor mount 330 is shown having a body 331 including an upper arcuate portion 332 and a lower body portion 333 defining the opening 334 for receiving motor 310. As seen best in FIG. 25a, the portion of body 331 adjacent the lower portion 333, identified at 335, is split or is laterally spaced from lower body portion 333 as seen by the gap 336. The gap permits the motor to be easily inserted into opening 334. To secure the motor in opening 334, as seen in FIG. 22 or 23, a cap screw 336 passes through an opening 337 in body portion 335 and is threaded into tapped hole 338 so as to clamp the motor within motor mount 330.

Figure 23:
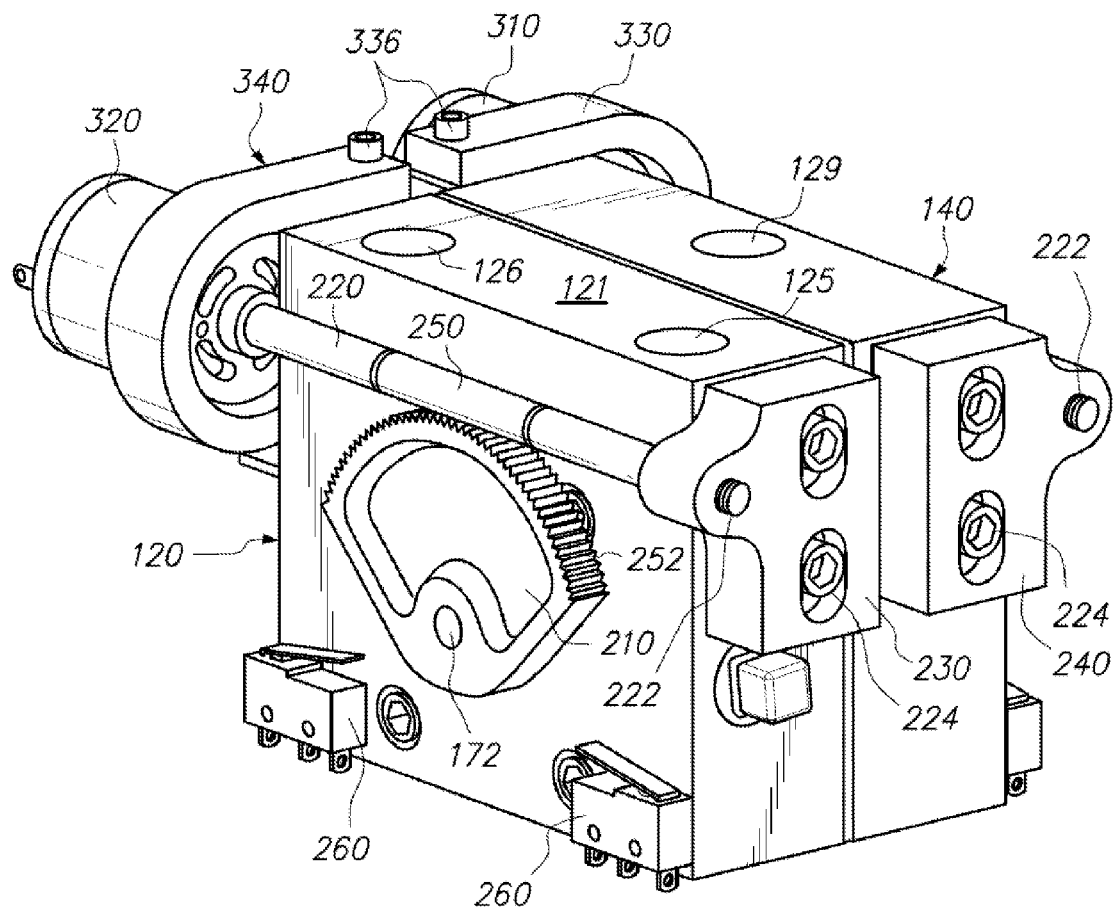
FIG. 23 is a second perspective view of the power source and transmission device shown in FIG. 22.

Referring now to FIGS. 22 and 23, it will be seen that the motor mounts 330, 340 are attached to valve body sections 120, 140 by a plurality of cap screws indicated at 341. The cap screws 341 pass through elongated openings 342 and 343 as seen in FIG. 25a. One end of the motors 310, 320 are attached to worm gear drive rods, to be described. The opposite end of motors 310, 320 have standard electrical leads 346 for electrical connection to electric wires 347 attached to controller 400 as seen best in FIG. 1.

Those having ordinary skill in the art will understand that power source 300 for the application within system 1000 may be electrical but other embodiments of power sources may constitute pneumatic or hydraulic systems or some combination of electrical, hydraulic or pneumatic in conjunction with mechanical transmission means to be described. For example, a hydraulic pump may be connected to hydraulic valves mounted in controller 400 which are operatively connected to the foot-operated pedal so as to open or close the hydraulic valves permitting hydraulic pressure through a suitable line to attach to hydraulic motors that may be mounted, similar to the electrical motors 310, 320 onto valve body 110, the hydraulic motors having an output shaft that will connect with the transmission system to be described. As another example, the controller may provide electric signals to an electric-powered hydraulic pump which in turn drives hydraulic motors directly without any intermediate transmission device. Those of ordinary skill in the art will understand that various power sources may be utilized in the present invention of the hands-free and bypass system embodiment 1000.

Transmission Device

First Embodiment

Figures 26A, 26B:
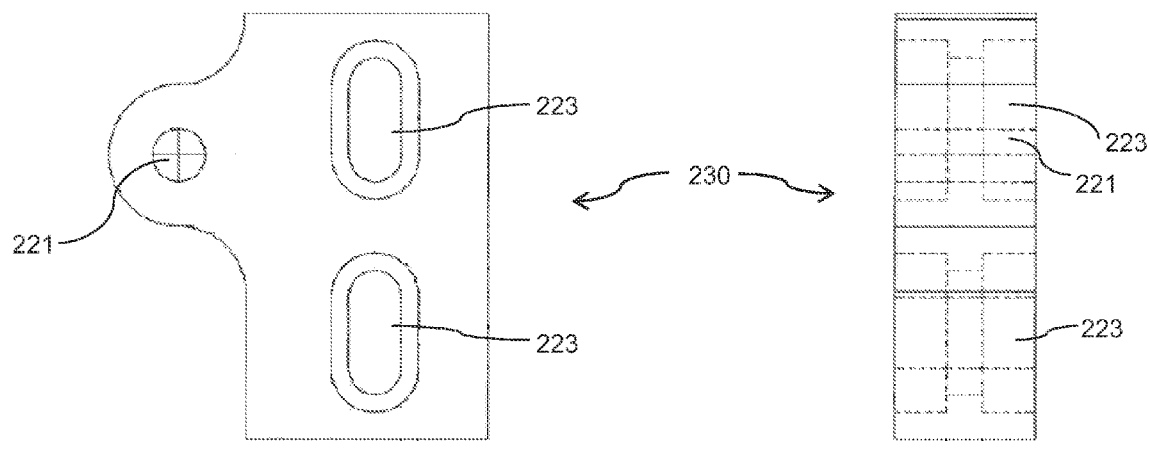
FIGS. 26a and b show a front and side view of a shaft support as shown in FIGS. 22-24.

Transmission system 200 in the embodiment here described comprises a gear segment 210 mounted on the end of valve shaft 172 so as to rotate shaft 172 and valve 170 so as to control the water temperature, as previously described. Gear segment 120 is in operative engagement with a rod 220 mounted at one end to motor 320 and at the opposite end in an opening 221 in one of a pair of rod mounts 230, 240 (see FIGS. 26a and b) that include an opening 223 for supporting end 222 of rod 220 in mount 230 which is in turn mounted on valve body section 120 through cap screws 224 as clearly shown in FIGS. 22 and 23. A portion of the rod 220 includes a helical worm gear 250 having gear teeth that cooperate with mating gear teeth 252 on gear segment 210. It will therefore be understood that as motors 310 and 320 are operated, drive rod 220 through helical worm gear portion 250 will rotate gear segment 210 thereby rotating shaft 172 to assume various rotational positions as was previously described in reference to the operation of the valve assembly 100. To prevent overdrive, a pair of stop electric switches 260 are mounted on the exterior face of body section 120 such that when gear segment 210 has been rotated to its maximum clockwise or counterclockwise position it will trip the switches 260 which in turn are wired through leads (not shown) to the motors 310, 320 so as to prevent further rotation of the motors and drive rod 220.

It will be understood by those of skill in the art that various transmission devices or mechanisms may be employed to operatively engage the power source 300 with the valve assembly 100 thereby controlling the valve assembly in the manner described above.

Transmission Device

Second Embodiment

As seen best in FIGS. 27 and 28, there is shown an alternative transmission device and motor position mounted on valve block body 110 having inlet openings 125, 126 and outlet opening 129. In this second embodiment, a large ring gear 280 is mounted on the shaft of one of the internal valves 170, 180 which were described above. The motors, 310, 320 are mounted below the valve assembly block 110 on block extensions 382, 390. Motor 310, as shown best in FIG. 26, has a pinion gear 382 in operative engagement with ring gear 380. Referring to FIG. 27, the outlet section 140 also has a ring gear 386 and a pinion 388 which are operatively engaged with motor 320 so as to selectively position the output valve 180 within output section 140 of body 110 at the desired flow rate. In this embodiment, motors 310 and 320 are stepper motors, such as obtainable from anaheimautomation.com12/10, TGM24-056-19-5V-020A-64R-LW4. It will be appreciated by those of ordinary skill in the art that the user of stepper motors in conjunction with controller 400 will permit indexed rotational movement of the shafts of valve bodies 170, 180 and therefore controlling both the temperature and flow rate of water through valve assembly 100.

Controller

Second Embodiment

Figure 31:
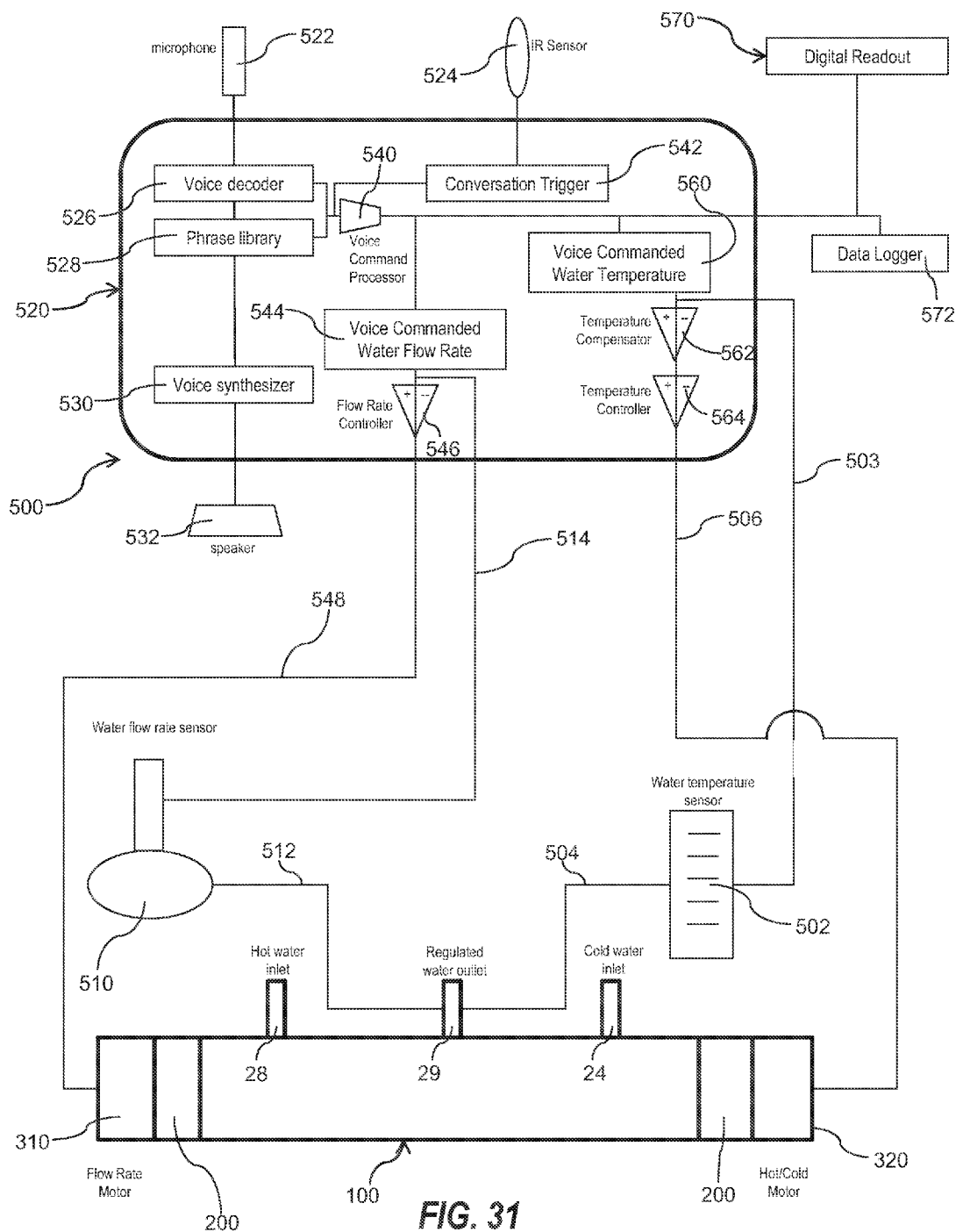
FIG. 31 shows a non-physical contact controller circuit and a simplified diagrammatic view of the valve assembly including a water temperature and water flow sensors that cooperate with the controller.
Figure 32:
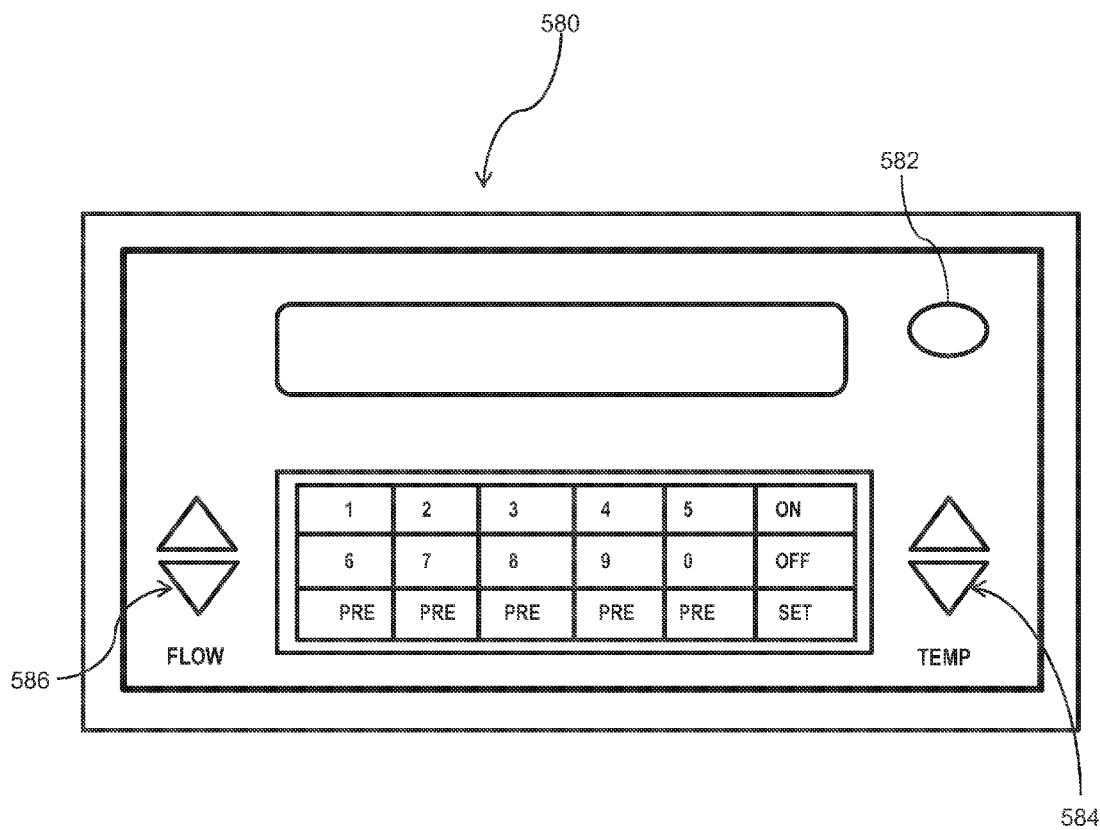
FIG. 32 is a display and touch-controller for regulating water temperature and flow rate.

As a second embodiment of a controller, there is shown in FIG. 31 a digital controller indicated generally at 500. The digital controller may cooperate with various types of valve assemblies, power sources, and transmission devices, but the controller 500 will be described here in reference to power source 300, transmission device 200 and valve assembly 100 as shown in FIG. 28. As previously described, the power sources are exemplified by electric motors 310, 320. The valve assembly 100 as previously described includes a hot water inlet, a cold water inlet and a regulated water outlet. The hot water and cold water inlets are connected to conventional water supplies as previously described; the regulated water outlet, is connected to the water fixture, such as water fixture 10 shown in FIG. 1.

Non-contact controller 500 includes a water temperature sensor 502, which may be an ordinary thermocouple (not shown) with an electrical output. Water temperature sensor 502 may be connected to the regulated water outlet directly, such as embedded within the regulated water outlet pipe 29 or may be exteriorly and/or remotely located but in temperature communication through line 504 to the water temperature within regulated water outlet. The water temperature sensor has an electrical outlet that is connected to a water temperature controller (to be described) by electrical wire 506.

Digital controller 500 also includes a flow rate sensor 510 that may be directly embedded in the regulated water outlet 29 or remotely located through a suitable connection such as 512. Water flow rate sensor 510 has an electrical output that is fed to a flow rate controller (to be described) through electrical path 514.

As an overview, the controller 520 of the present embodiment is actuated by the presence or proximity of the operator of the water delivery system through, for example, an infrared sensor. A voice actuated circuit, for example, responds to commands from the operator when the operator speaks. Unlike the common public restroom ON/OFF IR sensor systems, the operator of the embodiment of the invention to be described may verbally control both the temperature and the flow rate through the water fixture 10. The infrared presence or proximity sensor guards against voice activation by inadvertent commands from a nearby location by the operator or third persons.

In greater detail, controller 520 includes a microphone 522, and an IR sensor 524, suitably located with respect to the conventional water fixture 10, in the embodiment shown, which controls the operation of the system to deliver water to the user at a desired temperature and flow rate. Microphone 522 is connected to a voice decoder 526 that is connected to a phrase library 528. The voice decoder 526 and phrase decoder 528 are off-the-shelf products with which those of ordinary skill in the art are well acquainted. The voice decoder and phrase library is in circuit with voice synthesizer 530 that is in turn connected to a speaker 532. Thus, when voice commands are given through microphone 522, and properly decoded through voice decoder and phrase library 526 and 528, there is feedback to the system operator by converting the operator's voice command into verbal feedback or confirmation through the voice synthesizer 530 and speaker 532.

As shown, voice decoder and phrase library 526, 528 are output through circuitry to a voice command processor 540 which converts the command of the operator into electrical signals used to control the flow rate and temperature of the regulated water outlet. As previously described, IR sensor 524 activates a conversation trigger circuit 542 that permits activation of the voice command processor. The functions performed by the voice decoder, phrase library, and voice command processor may be combined in a single semiconductor device such as the NLP-5x natural language processor from Sensory, Inc. but such devices are commonly available off-the-shelf components. In circuit with the voice command processor 540 is a voice commanded water flow rate amplifier 544 that accepts commands from processor 540 that, as previously programmed, are water flow rate commands, that is, words in the phrase library that are intended to affect the water flow rate. The voice commanded water flow rate amplifier 544 is in circuit with a flow rate controller 546 that receives signals from water flow rate sensor 510, compares the extant flow rate with the commanded flow rate and provides an output signal to flow rate motor 310 through a suitable electrical connection 548.

In one embodiment as described above, the motors 310 and 320 may be stepper motors controlled by stepper motor controller integrated circuits or by software that generates signals that may be amplified, for example, by the L293 motor amplifier IC from Texas Instruments, Inc. Commands executed by the processor 540 may be sent to a digital readout 570 and converted, for example, by the 74 LS05 hex converter IC by Motorola, Inc. to drive LEDs on a display device to indicate an increase or decrease in water temperature or flow rate but may also indicate that the voice circuit is in a listening mode, or a sleep mode or that an error in voice recognition has occurred. It will be understood that various semiconductor devices and/or software that are coma only available for applications as here described are available.

The flow rate sub-system thus provides control over the amount of water exiting from the spout 14 of the standard water fixture 10 as desired by the operator's command. For example, the water flow rate command may be "more water" or "less water" which are then processed, provided to the flow rate receiver 544, and increases or decreases the signal output from flow rate controller 546 so as to cause flow rate motor 310 to operate the valves in valve assembly 100 to regulate the amount of water that will pass through regulated water outlet 29. Various other commands may be preprogrammed into the phrase library such as "maximum flow rate" or "minimum flow rate," or "normal" flow rate or "drip rate," or other commands that may be appropriate for controlling the water flow rate into the conventional water fixture 10.

Turning to the other sub-system, it will be seen that the voice command processor is connected to a voice commanded water temperature amplifier 560 that signals to temperature compensator 562 that is in circuit with amplifier 560 and voice command processor 540. As previously indicated, water sensor 502 is electrically connected to temperature compensator 562 through an electrical connection 503. The temperature compensator utilizes the water temperature sensor as the reference for comparison with the voice commanded water temperature, and provides an output signal to temperature controller 564 that is connected through line 566 to motor 320 thereby controlling the valve within valve assembly 100 that adjusts the amount of hot water and the amount of cold water that enters the valve assembly, is passed to the valve assembly outlet chamber, and through the regulated water outlet 29 to spout 14.

Voice commands to change the temperature of the regulated water may include common phrases such as "hotter" or "colder" or may specify a particular temperature, such as, "140 degrees Fahrenheit" or may command maximum or minimum temperature water by the words "hot" or "cold," It will be understood by those of ordinary skill in the art that any number of phrases, suitable for a particular application, may be preprogrammed into phrase library 528.

The voice decoder 526 and phrase library 528 also include commands that will turn the water delivery system on or off.

For example, when the system is in an inactive state, and a user approaches the system, so as to be sensed by IR sensor 524, and speaks into microphone 522, stating "ON," water will be delivered through spout 14 at the previous temperature setting when the system was deactivated. Conversely, when the system is active, and water is flowing from the spout 14, the user may command "OFF" that will terminate the water flow instantly. When the system is first installed, the user may choose from a catalog of phrases those which are suitable to the user for the particular application. The user is also provided with instructions for directing him or her to create unique words and/or phrases for use in the system by speaking into the microphone 522 after the voice decoder and phrase library have been set for word programming, and enter the phrases into phrase library 528.

The versatility of the water delivery system of the present invention may include a variety of applications other than those described above, including, for example, remote control of a system for dispensing water for a pet animal. For example, in place of or in addition to the water fixture 10, a separate water line may be provided to a small basin or bowl on the floor adjacent the water delivery system which includes a spout that is in turn controlled by a system as described above. The system incorporates a non-contact electronic controller such as controller 520 without the microphone 522 or IR sensor 524; in place of the microphone 522, there may be a digital transceiver, that is, in wireless connection with a wireless system within the facility in which the water fixture and animal are located, which in turn may be in wireless connection with a conventional wireless digital network such as a voice communication network or an internet network that permits a remote operator to provide commands that would be decoded and processed as described above but from a remote location. The animal may therefore be properly watered in the absence of the owner.

In still another application, consistent with those described above, the system may include a data logger 572 that provides the user with set parameters such as the amount of water used over a selected period of time, the typical water temperature during a time period, the number of times the system has been activated and similar usage patterns which will assist the user in conserving water by becoming aware of water waste. The data logger may be in circuit with the voice command processor circuit and may be of conventional off-the-shelf hardware provided with suitably programmed signal inputs and output reports available through, for example, digital readout 570.

As an alternative to, or in addition to, the non-contact sub-system of controller 520 a digital touch pad as shown at 580 may provide controlled water flow and temperature by touch icon 582 that functions as an ON/OFF switch. Touch icon 584 provides input for increasing or decreasing water temperature. Touch icon 586 similarly provides a method for input of water flow control. A display 588 may be programmed to provide instructions for use of the system, information regarding the current status of the system, and various status conditions during operation of the system such as providing the temperature of the water in a general sense—hot, cold, warm—or a specific temperature in either Fahrenheit or Celsius. The above-described data logger may be in circuit with display 588 providing usage data and, for example, if water quotas are implemented at the facility in which the system is installed, the permissible quantity of water remaining available within the quota. The numerical pad may be programmed with various pre-set commands as indicated on the display.

I claim:
1. A valve apparatus for controlling the temperature and flow of water or other fluid from a hot water source and a cold water source to an outlet, comprising;
   an input body having two ports one connected to a cold water source and one connected to a hot water source,
      a cylindrical chamber in an inner face of said input body adapted to receive a temperature control rotatable valve member,
      said input body cylindrical chamber having two arcuately spaced apart holes located near the periphery thereof,
      each hole connected to one of said hot and cold water ports, and
      a center hole adapted to receive a shaft of said temperature control rotatable valve member;
   said temperature control rotatable valve member having substantially flat ends and a center axis,
      a temperature control rotatable valve member shaft projecting from a first of said flat ends, said first flat end having two circular slots each with a depth less than the thickness of said temperature control rotatable valve member,
      said temperature control rotatable valve member received in said input body cylindrical chamber,
      each of said circular slots having a radius greater than the radius of said temperature control rotatable valve member,
      said circular slots radial axes being non-concentric with said temperature control rotatable valve member axis,
      said second flat end of said temperature control rotatable valve member having a circular groove in the face thereof,
      each of said circular slots in said first flat end having a through hole adjacent one end thereof in fluid connection said circular groove;
      said circular slots arranged relative to said temperature control rotatable valve member axis such that at least one portion of each of said slots may be in fluid connection with one of said holes in said input body cylindrical chamber;
   an output body having a single port connected to an outlet,
      a cylindrical chamber in an inner face of said output body adapted to receive a flow rate control rotatable valve member,
      said output body cylindrical chamber having a hole located near the periphery thereof connected to said outlet port, and
      a center hole in said output body cylindrical chamber adapted to receive a shaft of said flow rate control rotatable valve member;
   said flow rate control rotatable valve member having substantially flat ends,
      said shaft projecting from a first of said flow rate control rotatable valve member ends, said first flat end having a circular slot with a depth less than the thickness of said flow rate control rotatable valve member,
      said flow rate control rotatable valve member received in said output body cylindrical chamber,
      said circular slot radius equal to or greater than the radius of said flow rate control rotatable valve member,
      said circular slot radial axis non-concentric with said flow rate control rotatable valve member axis,
      said circular slot in said first flat end having a through hole adjacent one end thereof in fluid connection with said other flat end,
      said circular slot arranged relative to said flow rate control rotatable valve member axis such that at least one portion of said circular slot may be in fluid connection with said hole in said output body cylindrical chamber; and a flat plate having a centrally located through hole positioned between said input and said output bodies for connecting said input body cylindrical chamber with said output body cylindrical chamber.

2. The valve apparatus of claim 1 for controlling the temperature and flow of water from a hot source and a cold source to an outlet wherein each of said circular arc slots in said temperature control rotatable valve member is in fluid connection with one of said arcuately spaced holes in said input body cylindrical chamber wherein hot and cold water are mixed.

3. The valve apparatus of claim 1 for controlling the temperature and flow of water from a hot source and a cold source to an outlet wherein only one of said circular arc slots in said flow rate control rotatable valve member is in fluid connection with one of said arcuately spaced holes in said input body cylindrical chamber whereby only hot or cold water passes through said valve apparatus.

4. A valve assembly for controlling the mixture and flow rate of a fluid from a first fluid source and a second fluid source to an outlet, comprising;

a first body section having two fluid ports each connected to one of said first and second fluid sources,
a cylindrical cavity in said first body section,
said cylindrical cavity having two spaced apart round holes located near the periphery thereof, each of said round holes connected to one of each of said two fluid ports, and
a central bearing hole;

a first cylindrical rotatable valve member for controlling fluid entry into said valve assembly, said first cylindrical rotatable valve member having substantially flat ends and a center axis, said first cylindrical rotatable valve member received in said cylindrical cavity of said first body section,
a shaft projecting from a first of said substantially flat ends of said first cylindrical rotatable valve member received in said central bearing hole in said cylindrical cavity of said first body section,
said first cylindrical rotatable valve member having two circular arc channels in the face of said rotatable member from which said shaft projects,
each of said circular arc channels having a radius at least equal to the radius of said first cylindrical rotatable valve member,
the center point of the arc of each of said channels is non-coaxial with said first cylindrical rotatable valve member axis,
each of said circular arc channels having a through hole,
each of said circular arc channels arranged relative to said first cylindrical rotatable valve member axis such that each of said channels may be in fluid connection with one of said round holes in said cylindrical cavity of said first body section at a first rotated position and out of fluid connection with either of said round holes at a second rotated position,
said second substantially flat end of said first cylindrical rotatable valve member having a circular groove in the face thereof, said groove in fluid connection with both of said circular arc through holes;

a second body section having a single fluid port connected to said assembly outlet,
a cylindrical cavity in said second body section,
said cylindrical cavity having a round hole located near the periphery thereof in fluid connection to said fluid port, and
a central bearing hole;

a second cylindrical rotatable valve member for controlling fluid flow from said valve assembly, said second cylindrical rotatable valve member having substantially flat ends, a center axis, and received in said second body section cylindrical cavity,
a shaft projecting from a first of said substantially flat ends of said second cylindrical rotatable valve member is received in said central bearing hole in said second body section cylindrical cavity,
said second cylindrical rotatable valve member having a circular arc channel in the face of said second cylindrical rotatable valve member from which the shaft projects,
said circular arc channel having a radius at least equal to the radius of said second cylindrical rotatable valve member,
said circular arc channel radial axis is non-coaxial with said second cylindrical rotatable valve member axis,
said circular arc channel having a through hole,
said circular arc channel arranged relative to said second cylindrical rotatable valve member axis such that said channel is in fluid connection with said round hole in said second body section cylindrical cavity in a first rotated position and out of fluid connection with said round hole in a second rotated position; and a third body section having a through hole positioned between said first and second body sections for connecting said second cylindrical rotatable valve member circular arc through hole with said third body section through hole whereby fluid received from said cylindrical cavity of said first body section may pass through said third body section through hole and said cylindrical cavity of said second body sections to said valve assembly outlet.

5. The valve apparatus of claim 4 for controlling the mixture and flow rate of fluids from said first and second fluid sources to an outlet wherein each of said circular arc channels in said temperature control rotatable valve member are in selective fluid connection with said spaced apart round holes in said first body section cylindrical cavity wherein fluid from said first and second fluid sources are mixed.

6. The valve apparatus of claim 4 for controlling the mixture and flow rate of a fluid from said first and second fluid sources to an outlet wherein one of said circular arc channels in said temperature control rotatable valve member is in selective fluid connection with said spaced apart round holes in said first body section cylindrical cavity wherein only fluid from one of said fluid sources passes through said valve assembly.

* * * * *